US012643780B2

(12) United States Patent
Chesbrough et al.

(10) Patent No.: US 12,643,780 B2
(45) Date of Patent: Jun. 2, 2026

(54) PERSONAL ELEVATING PLATFORM

(71) Applicant: Cleverosity Design Group, LLC, San Diego, CA (US)

(72) Inventors: Richard M. Chesbrough, San Diego, CA (US); Matt Roman, San Diego, CA (US)

(73) Assignee: Cleverosity Design Group, LLC, San Diego, CA (US)

( * ) Notice: Subject to any disclaimer, the term of this patent is extended or adjusted under 35 U.S.C. 154(b) by 1156 days.

(21) Appl. No.: 17/187,772

(22) Filed: Feb. 27, 2021

(65) Prior Publication Data

US 2021/0269295 A1 Sep. 2, 2021

Related U.S. Application Data

(60) Provisional application No. 63/100,106, filed on Feb. 28, 2020.

(51) Int. Cl.

| | |
|---|---|
| ***B66F 11/04*** | (2006.01) |
| ***B66F 7/06*** | (2006.01) |
| ***B66F 17/00*** | (2006.01) |
| *B66F 7/08* | (2006.01) |

(52) U.S. Cl.

CPC ............ *B66F 11/042* (2013.01); *B66F 7/065* (2013.01); *B66F 17/006* (2013.01); *B66F 7/085* (2013.01)

(58) Field of Classification Search

CPC .... B66F 7/06; B66F 7/065; B66F 7/08; B66F 11/042; A47B 9/16; A47B 2200/0063

See application file for complete search history.

(56) References Cited

U.S. PATENT DOCUMENTS

| | | | | |
|---|---|---|---|---|
| 544,821 A * | 8/1895 | Morrison | A47B 9/16 108/116 |
| 2,739,849 A * | 3/1956 | Lynn | E06C 1/38 182/132 |
| 3,203,670 A * | 8/1965 | Farris | B66F 7/08 108/120 |
| 3,737,055 A | 6/1973 | Pettit | |

(Continued)

OTHER PUBLICATIONS

DKELI “32" Standing Desk, Height Adjustable Stand Up Desk Converter Sit to Stand Desk Gas Spring Riser with Keyboard Tray, Ergonomic Home Office Computer Workstation for Desktop Laptop Dual Monitors, Black” (accessed May 27, 2021).

(Continued)

*Primary Examiner* — Colleen M Chavchavadze

(74) *Attorney, Agent, or Firm* — Jacob M. Ward; Ward law Office LLC

(57) ABSTRACT

An elevating apparatus includes a platform plate that can be raised and lowered. Once the platform plate has risen, it is locked in place and capable of supporting a load. In some embodiments, the elevating apparatus incorporates four arms in a scissor configuration to support and stabilize the platform plate. In some embodiments, the elevating apparatus incorporates a gas cylinder assembly to apply an upward force on the platform plate so that it rises when released from the lowered position. In some embodiments, a cushioned surface is deployed on the platform plate and around the base so that when the elevating apparatus is in the compressed position, it resembles a cushioned mat.

20 Claims, 37 Drawing Sheets

(56) References Cited

U.S. PATENT DOCUMENTS

| | | | | |
|---|---|---|---|---|
| 3,889,778 | A * | 6/1975 | Dotts | B66F 11/042 182/69.5 |
| 4,019,604 | A | 4/1977 | Benson | |
| 4,071,222 | A | 1/1978 | Wright | |
| 4,157,743 | A * | 6/1979 | Masuda | B66F 11/042 187/269 |
| 4,319,666 | A * | 3/1982 | Hunter | B66F 7/26 187/207 |
| 4,558,648 | A | 12/1985 | Franklin et al. | |
| 4,558,847 | A | 12/1985 | Coates | |
| 4,573,663 | A | 3/1986 | Nussbaum | |
| 4,682,750 | A | 7/1987 | Rudolph et al. | |
| 4,712,653 | A | 12/1987 | Franklin et al. | |
| 4,741,512 | A | 5/1988 | Elkuch et al. | |
| 4,754,713 | A | 7/1988 | Compagnone | |
| D307,814 | S | 5/1990 | Kawana | |
| D308,743 | S | 6/1990 | Kawana | |
| 4,930,598 | A | 6/1990 | Murrill et al. | |
| 5,131,492 | A | 7/1992 | Caminiti et al. | |
| 5,131,501 | A * | 7/1992 | Yoshikawa | B62B 3/0625 187/244 |
| 5,192,053 | A * | 3/1993 | Sehlstedt | B66F 7/065 182/69.5 |
| 5,285,992 | A * | 2/1994 | Brown | F16M 11/38 248/421 |
| 5,588,377 | A * | 12/1996 | Fahmian | A47B 9/16 248/164 |
| 5,722,513 | A | 3/1998 | Rowan et al. | |
| 5,934,414 | A * | 8/1999 | Staczek | B66B 9/02 187/269 |
| 6,182,796 | B1 | 2/2001 | Perlstein et al. | |
| 6,286,629 | B1 * | 9/2001 | Saunders | B66F 7/08 187/394 |
| 7,188,843 | B2 | 3/2007 | Magness | |
| 7,194,358 | B2 * | 3/2007 | Callaghan | B66F 17/006 340/436 |
| 7,213,686 | B2 | 5/2007 | Kaufman | |
| 7,246,784 | B1 | 7/2007 | Lopez | |
| 7,249,771 | B1 * | 7/2007 | Brennan | B60R 11/06 280/35 |
| 7,640,608 | B2 * | 1/2010 | Smith | A61G 13/0018 5/617 |
| 7,705,251 | B2 | 4/2010 | Herrmann | |
| 7,963,505 | B2 | 6/2011 | Taylor et al. | |
| 8,210,319 | B2 | 7/2012 | Boyd et al. | |
| 8,672,297 | B2 | 3/2014 | Schmitt et al. | |
| 9,079,756 | B2 | 7/2015 | Beji | |
| 9,096,415 | B2 | 8/2015 | Bleeker et al. | |
| 9,212,038 | B1 * | 12/2015 | Presti | E04G 1/22 |
| 9,370,458 | B2 | 6/2016 | Wem | |
| 9,555,309 | B1 * | 1/2017 | LaBar | A63B 21/0724 |
| 10,017,093 | B1 | 7/2018 | Murphy et al. | |
| D825,131 | S | 8/2018 | Wik | |
| D827,241 | S | 8/2018 | Kritzer et al. | |
| 10,271,655 | B1 | 4/2019 | Gwen | |
| 10,542,817 | B2 * | 1/2020 | Swartz | A47B 9/02 |
| D891,819 | S | 8/2020 | Kang | |
| 10,918,079 | B1 * | 2/2021 | Mora | F16M 11/38 |
| 11,247,883 | B2 * | 2/2022 | Hill | B66F 3/08 |
| 2003/0053897 | A1 | 3/2003 | Finkbeiner | |
| 2003/0189194 | A1 * | 10/2003 | Latvys | B66F 7/08 254/9 C |
| 2004/0069979 | A1 | 4/2004 | Hicks et al. | |
| 2006/0283669 | A1 | 12/2006 | Patten et al. | |
| 2007/0235266 | A1 * | 10/2007 | Dantas | B66F 7/065 187/269 |
| 2008/0156589 | A1 * | 7/2008 | Marchand | B66F 7/065 187/219 |
| 2009/0277723 | A1 | 11/2009 | Straub | |
| 2009/0288918 | A1 | 11/2009 | Schmitt | |
| 2010/0012907 | A1 * | 1/2010 | Lee | B66F 7/08 254/131 |
| 2010/0243973 | A1 * | 9/2010 | Deuring | B66F 7/065 254/122 |
| 2013/0145972 | A1 * | 6/2013 | Knox | B60N 2/24 108/147 |
| 2013/0341984 | A1 | 12/2013 | Olesen | |
| 2014/0014886 | A1 | 1/2014 | Ruth sen. | |
| 2014/0041963 | A1 | 2/2014 | O'Shea | |
| 2017/0340104 | A1 | 11/2017 | Chuang | |
| 2017/0349196 | A1 | 12/2017 | Camarco et al. | |
| 2017/0354245 | A1 | 12/2017 | Martin et al. | |
| 2019/0084763 | A1 | 3/2019 | Beer | |
| 2020/0290854 | A1 | 9/2020 | McKinney et al. | |
| 2020/0387134 | A1 | 12/2020 | Xiang et al. | |

OTHER PUBLICATIONS

NicePet "Z-Lift Dog Grooming Table, 42.5" Professional Pet Grooming Table with Adjustable Grooming Arm & Noose, Foldable Z-Lift Tables Stand Pet Supplies Best for Small Medium Large Dog & Cat, S11990" (accessed May 27, 2021).

Pinterest "How to Build A Personal Elevator Homemade Lift Hoist 1946 DIY" (accessed May 27, 2021).

Ryan's Pet Supplies "Paw Brothers Super Low-Low Electric Grooming Table" (accessed May 27, 2021).

Southworth "Scissor Lift Table, 300 lb., 23 In. L" (accessed May 27, 2021).

Displays 2 Go "31"×22" Sit Stand Desktop Workstation, Gas Lift, Adjustable Height—White" (accessed May 27, 2021).

* cited by examiner

PERSONAL ELEVATING PLATFORM

REFERENCE TO RELATED APPLICATION

This application claims the benefit of U.S. Provisional Patent Application No. 63/100,106, filed on Feb. 28, 2020.

BACKGROUND

For the average sized individual, there are a number of situations in daily life for which one may need extra height to manage a "vertical challenge." Examples include retrieving items in the kitchen from hard to reach shelves in dish cabinets, refrigerators, and pantries, gaining elevation with respect to a work surface, reaching light bulbs or ceiling fixtures for maintenance, or needing a step for access into a vehicle or bathtub. For children of a certain age, there is often a need for an elevated platform to assist with brushing teeth or combing hair while looking in the bathroom mirror, and the large child stepstool industry demonstrates that need. In the medical arena, surgeons sometimes desire a specific elevated height in order to most effectively operate. In such situations, there is a need that occurs in a defined location on a regular basis, representing a "recurrent vertical challenge." There is, therefore, a need for a solution that provides additional height and is efficient, safe, and convenient.

While there are various tools already commonly available to increase one's height, having the added ability to collapse and conceal the device in its location would be useful in many scenarios. Most tools, like fixed-height platforms, ladders, step stools, or other home objects, need to be retrieved from their storage location and properly set up in a secured area. After the task that required the increased height is complete, the device must then be deconstructed (if necessary) and placed back in storage. If not returned to storage, ladders and step stools may occupy significant space in a room and become an obstacle for passersby.

Apparatuses like drivable scissor lifts can move from a compact position to an extended position in order to elevate people or items. Scissor lift technology is found in a number of different devices, such as hospital gurneys, equipment lifts, stools, and adjustable tables and beds.

Individuals of all heights sometimes desire to elevated higher, even for a small distance, evincing a need for a safe, convenient, and efficient platform which can support a person. Thus, there remains a need for a raisable platform that can support a person when raised and, when compressed, can stay in place without being intrusive in a room or pose a tripping hazard.

There is often a need to raise a surface or object a short distance. For example, if two people of different heights share a work bench, or table, it may be desirable for the taller person to be able to raise a work surface above the height of the work bench. In this and comparable scenarios, there is a need for a convenient raisable platform movable between raised and lowered positions.

SUMMARY

According to various embodiments based on the principles disclosed herein, an elevating apparatus includes a platform plate that can be raised by engaging a pedal (or other mechanism). The platform plate has an upward force exerted by a gas cylinder (or other mechanism). Once the platform plate has risen, it is locked in place and capable of supporting a load. For example, the supported load can be a person standing on the platform plate in the raised position.

When the pedal (or other mechanism) is actuated again, the platform plate is able to be lowered back down until it reaches the base plate and is locked into place. In some embodiments, the elevating apparatus incorporates four arms in a scissor configuration to support and stabilize the platform plate and an appropriate load on the platform plate.

In some embodiments, hinged walls are used to support the platform plate in the raised position. In some embodiments, struts are used to support the platform plate in the raised position. In some embodiments, pivoting arms are used to support the platform plate in the raised position. In some embodiments, leaf springs are used to support the platform in the raised position. In some embodiments, a slot frame or similar structure enables the platform plate to be secured in one or more intermediate positions in between the fully compressed and the fully raised positions.

Any of the embodiments mentioned herein may contain one or more features that are disclosed with respect to other embodiments without departing from the principles disclosed herein. For example, instead of, or in addition to, a pedal, an elevating apparatus can include a platform plate that can be raised by pressing a button, pulling a handle, activating a switch, activating a solenoid, activating a remote control, interacting with a voice-activation system, and/or other suitable means or methods of initiating an action (such as clapping). Instead of, or in addition to, a gas cylinder to provide a separating force between the base and the platform plate, various embodiments of an elevating apparatus can comprise one or more springs, biased hinges, or a hydraulic assembly so that the platform plate rises when released or the action is initiated by other means. In some embodiments, the elevating apparatus incorporates four arms that are not in a scissor configuration to support and stabilize the platform plate. In various embodiments, a cushioned surface may be deployed on the platform plate. In various embodiments, a cushioned surface may be deployed around the base. In various embodiments, a cushioned surface may be deployed on the platform plate and around the base so that when the elevating apparatus is in the compressed position, it resembles a cushioned mat.

In some embodiments, more than one gas cylinder assembly is used to apply a force on the platform plate. In some embodiments, the platform may be raised or lowered by a motor powered by a battery or plugged into a wall outlet. In some embodiments, the platform plate may be actuated by an electronic solenoid actuator that allows for raising or lowering of the platform. Additional features may be incorporated into one or more embodiments. For example, in some embodiments, a carrying handle is provided so that a person may easily pick up and carry the elevating apparatus in between uses. Other features include perforations in the platform, lights, curtains, handles, and a bench attachment. In some embodiments, the platform plate and/or base may comprise perforations. In some embodiments, the platform plate and/or base may comprise lights. In some embodiments, the elevating apparatus may comprise one or more curtains (or other suitable protective covering). In some embodiments, the elevating apparatus may comprise one or more handles. In some embodiments, the platform plate may comprise one or more attachment holes. In some embodiments, the platform plate may comprise a bench attachment. In some embodiments, the elevating apparatus may comprise a dampener. In some embodiments, the elevating apparatus may comprise one or more vibration sources. In some embodiments, the elevating apparatus may comprise one or more heating elements. In some embodiments, the elevating apparatus may comprise one or more photovoltaic cells. In some embodiments, the elevating apparatus may comprise one or more batteries. In some embodiments, the elevating apparatus may comprise an electrical cord. In some embodiments, an elevating apparatus may be built into a floor (or other surface) or inserted into a recess in a floor (or other surface). In some embodiments, an elevating apparatus may be built into a drawer or similar apparatus that can be slid into or out of a wall, cabinet, drawer, or similar environment.

An elevating apparatus in accordance with the principles disclosed herein may comprise parts made of plastic, wood, metal, composite, other suitable materials, or a combination of one or more of the foregoing. Rubber, foam, vinyl, plastic, composite, gel, carpet, and/or other suitable substances may be used to form a cushioned surface on the platform plate and/or base. In some applications, a hard and/or textured material may be used instead of cushioning material on the platform plate and/or outer base surfaces.

BRIEF DESCRIPTION OF THE DRAWINGS

The detailed description makes reference to the accompanying figures wherein.

The figures are only intended to facilitate the description of the principles disclosed herein. The figures do not illustrate every aspect of the principles disclosed herein and do not limit the scope of the principles disclosed herein. Other objects, features, and characteristics will become more apparent upon consideration of the following detailed description.

DETAILED DESCRIPTION

A detailed illustration is disclosed herein. However, techniques, methods, processes, systems, and operating structures in accordance with the principles disclosed herein may be embodied in a wide variety of forms and modes, some of which may be quite different from those disclosed herein. Consequently, the specific structural and functional details disclosed herein are merely representative.

None of the terms used herein, including "plate," "base," "arm," "track," "hook, "bar," "frame," "compressed," "raised," and "deployed" are meant to limit the application of the principles disclosed herein. The terms "first," "second," and the like may refer to different or identical objects. The foregoing terms are used to illustrate the principles disclosed herein and are not intended to be limiting. Other explicit and implicit definitions may also be included below. The term "base plate" is intended to comprise, where suitable to the application, a flat bottom surface and a raised structural frame around the perimeter of the flat bottom surface.

Figure 1:
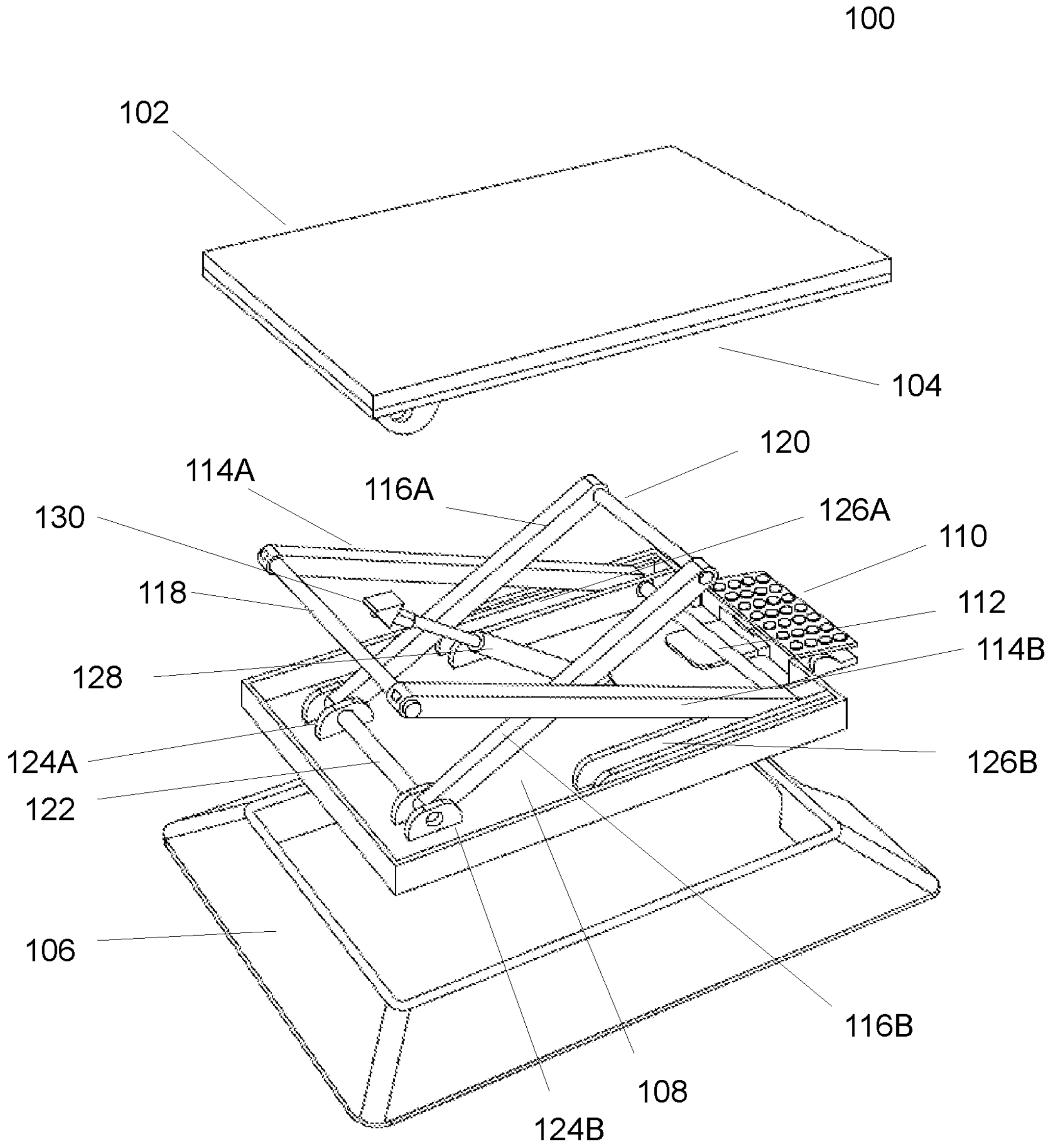
FIG. 1 illustrates an exploded view of an elevating apparatus in accordance with the principles disclosed herein.

FIG. 1 shows an exploded view of elevating apparatus 100, which comprises a platform surface 102, platform plate 104, base cushion 106, base plate 108, and pedal 110. Locking bar 112 is coupled to first outer arm 114A and second outer arm 114B. When elevating apparatus 100 is in a compressed state, first outer arm 114A and second outer arm 114B are positioned in first alignment track 126A and second alignment track 126B, respectively. First inner arm 116A and second inner arm 116B are coupled to base support bar 122 and base plate 108 at first base hinge point 124A and second base hinge point 124B, respectively. It should be appreciated that first inner arm 116A and second inner arm 116B may be fixed with base support bar 122 and rotationally coupled to base plate 108. In some embodiments, first inner arm 116A and second inner arm 116B may be rotationally coupled to a base support bar 122 which is fixed with respect to base plate 108. In some embodiments, first outer arm 114A, second outer arm 114B, first inner arm 116A, and second inner arm 116B may attach to hinge points coupled to the outer walls of base plate 108 instead of the bottom surface of base plate 108.

First cross bar 118 is coupled to first outer arm 114A and second outer arm 114B. Second cross bar 120 is coupled to first inner arm 116A and second inner arm 116B. When elevating apparatus 100 is assembled, first cross bar 118 and second cross bar 120 are each coupled to platform plate 104. Gas cylinder assembly 128 comprises a gas cylinder and a strut. One end of gas cylinder assembly 128 is coupled to base plate 108, and the opposite end of gas cylinder assembly 128 is coupled to platform plate 104 at gas cylinder platform attachment 130. While gas cylinder assembly 128 is shown in the present embodiment, it should be understood that other pneumatic devices may be substituted where appropriate, such as, without limitation, a cylinder assembly incorporating a liquid.

Figure 2A:
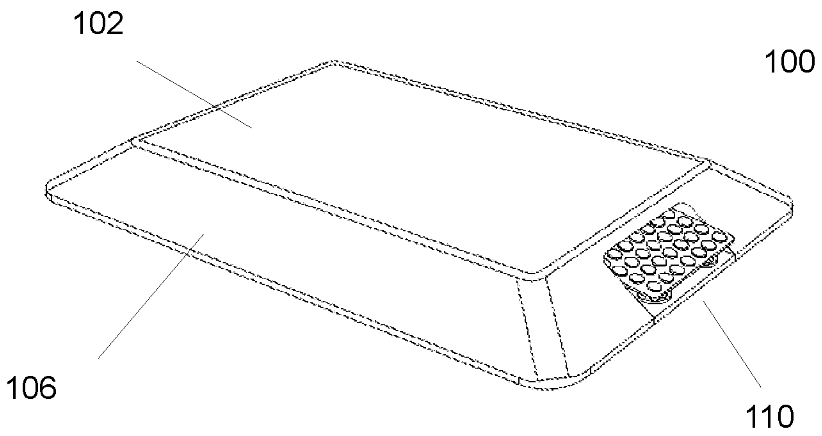
FIGS. 2A and 2B illustrate the elevating apparatus of FIG. 1 in a lowered state.
Figure 2B:
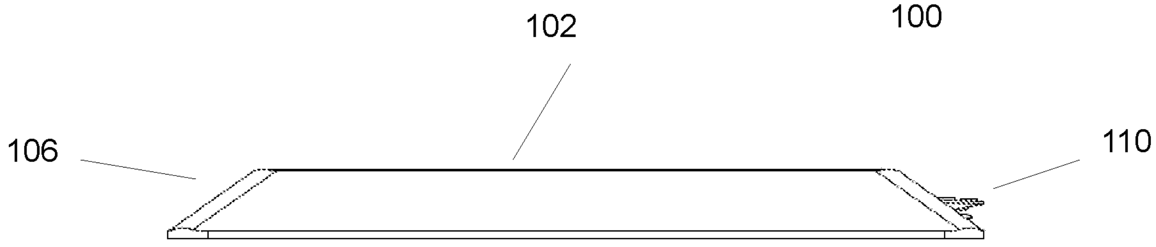

FIGS. 2A and 2B show elevating apparatus 100 in a compressed position. In this position, platform surface 102 is flush or nearly flush with base cushion 106.

Figure 3:
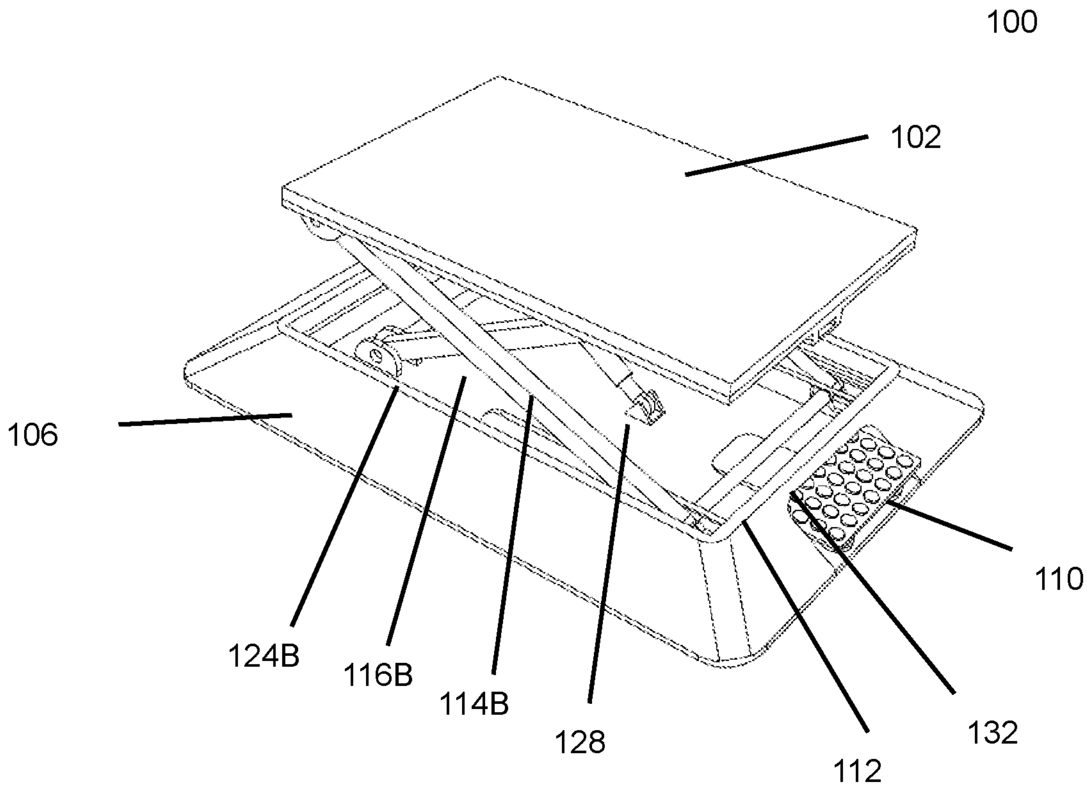
FIG. 3 illustrates the elevating apparatus of FIG. 1 in an elevated state.

FIG. 3 shows a perspective view of elevating apparatus 100 in a raised position. Pedal 110 is coupled to pedal plate 132 which is configured to engage with locking bar 112 when pedal 110 is pressed.

Figure 4:
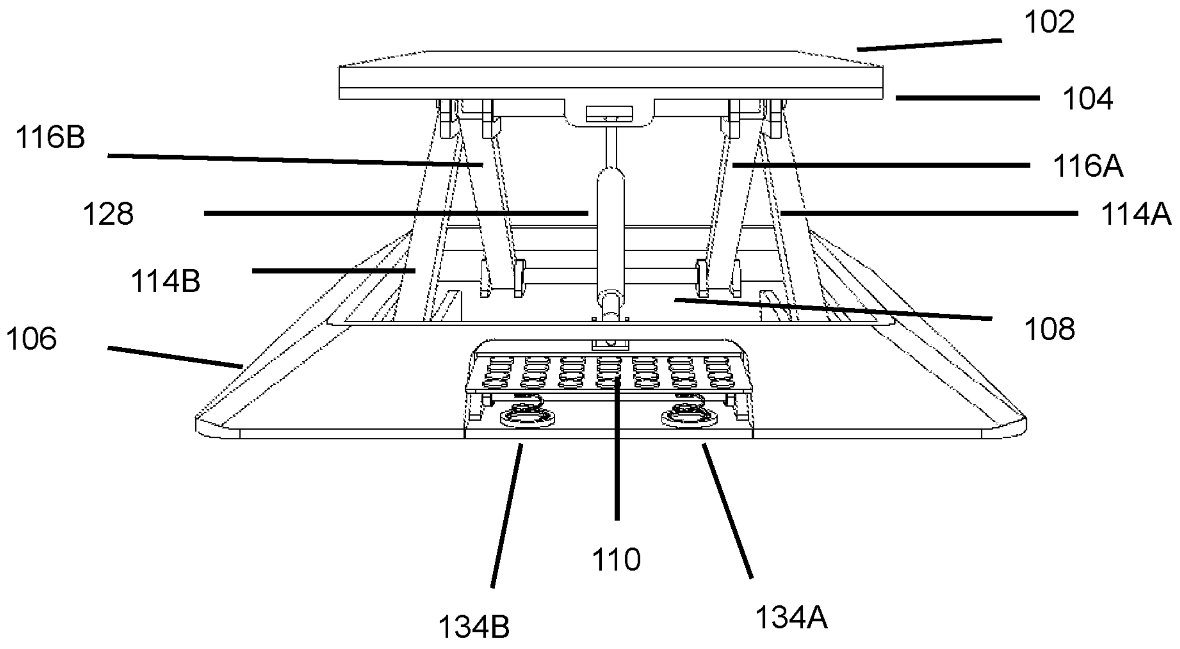
FIG. 4 illustrates an end view of the elevating apparatus of FIG. 1 in an elevated state.

FIG. 4 shows an end view of elevating apparatus 100 in a raised position. First pedal spring 134A and second pedal spring 134B are each coupled to base plate 108 and the bottom of pedal 110. First pedal spring 134A and second pedal spring 134B provide a biasing force upward on pedal 110 and may be compressed when a user steps on pedal 110.

Figure 5:
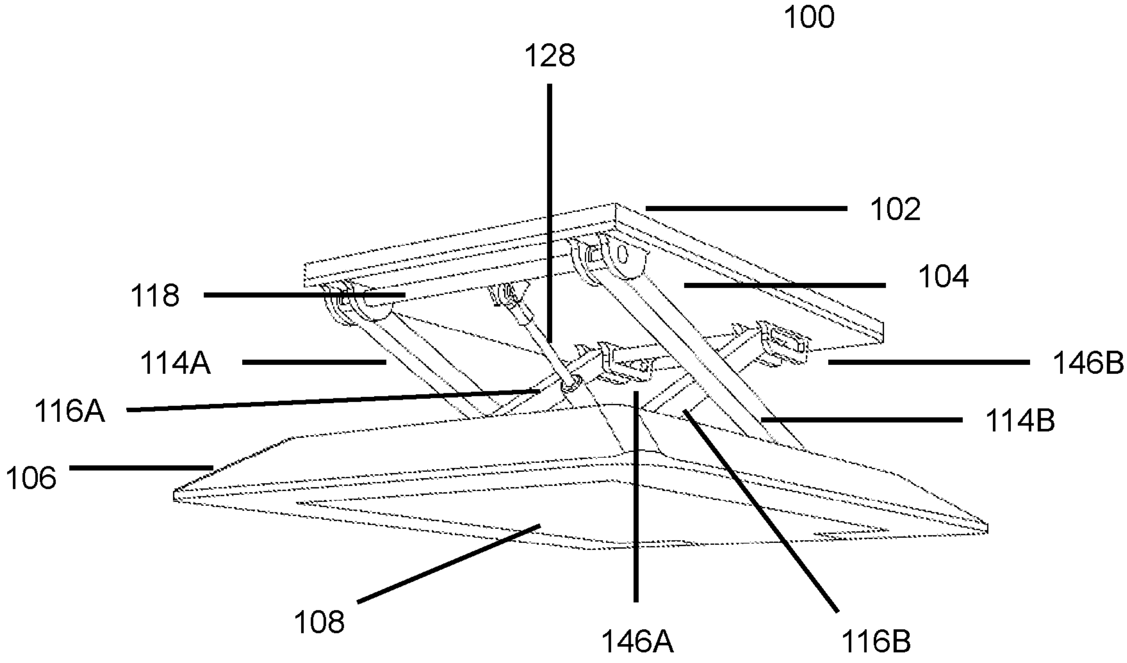
FIG. 5 illustrates a lower view of the elevating apparatus of FIG. 1 in an elevated state.

FIG. 5 shows a lower perspective view of elevating apparatus 100 in a raised position. The bottom side of platform plate 104 is coupled to first cross bar 118, second cross bar 120, and gas cylinder assembly 128. In the embodiment shown, the bottom side of base plate 108 is exposed inside a perimeter formed by base cushion 106 and would support elevating apparatus 100 on a floor or other surface.

Figure 6:
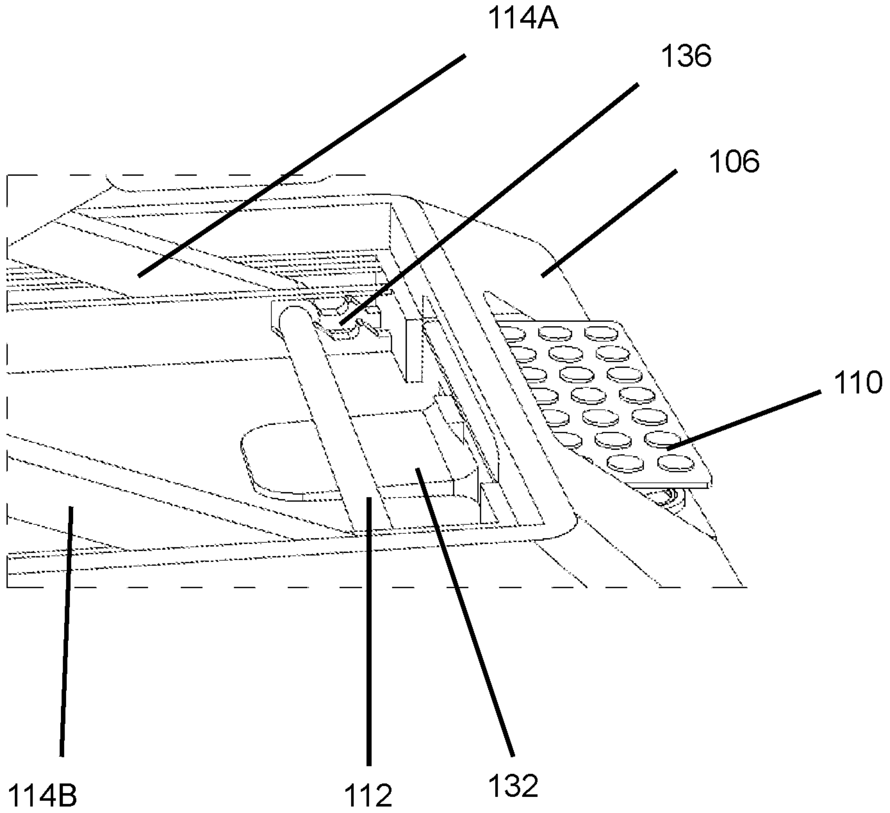
FIG. 6 illustrates a close up of the interior of the elevating apparatus of FIG. 1 and one example of a locking mechanism.

FIG. 6 shows the connection between pedal 110 and pedal plate 132. When pedal 110 is pressed down by a user, pedal plate 132 angles upwards, thereby lifting locking bar 112. The disclosed embodiment comprises notches 136, each of which may hold locking bar 112 in position. As shown, locking bar 112 is in the notch that corresponds to elevating apparatus 100 in a fully raised position. By lowering pedal 110 and correspondingly raising pedal plate 132, a user can press down on platform plate 104 until locking bar 112 moves into a different notch. In the embodiment shown, a center notch represents a position in which the platform plate 104 is raised to an intermediate position, and the notch closest to the pedal represents the position in which platform plate 104 is fully lowered and elevating apparatus 100 is compressed.

Figure 7:
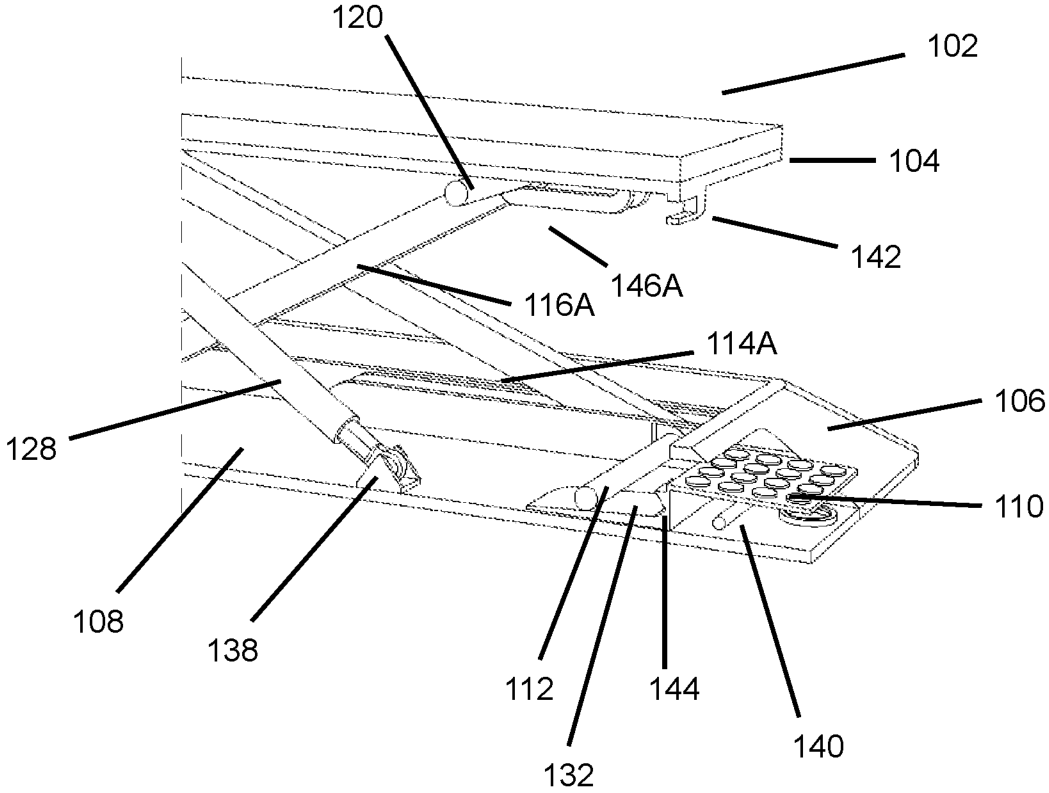
FIG. 7 illustrates a side cutaway view of the elevating apparatus of FIG. 1.

FIG. 7 shows a side cutaway view of elevating apparatus 100. When platform plate 104 is raised or lowered, second cross bar 120 slides along first sliding track 146A (shown) and second sliding track 146B (not shown in this view). As platform plate 104 is lowered, second cross bar 120 slides to the right as depicted in FIG. 7. Also shown in FIG. 7, gas cylinder assembly 128 is coupled to base plate at gas cylinder base attachment 138. Pedal bar 140 is visible underneath the step surface of pedal 110. Locking hook 142 is coupled to platform plate 104. When elevating apparatus 100 is in a compressed position, locking hook 142 engages with protrusion 144.

Figure 8:
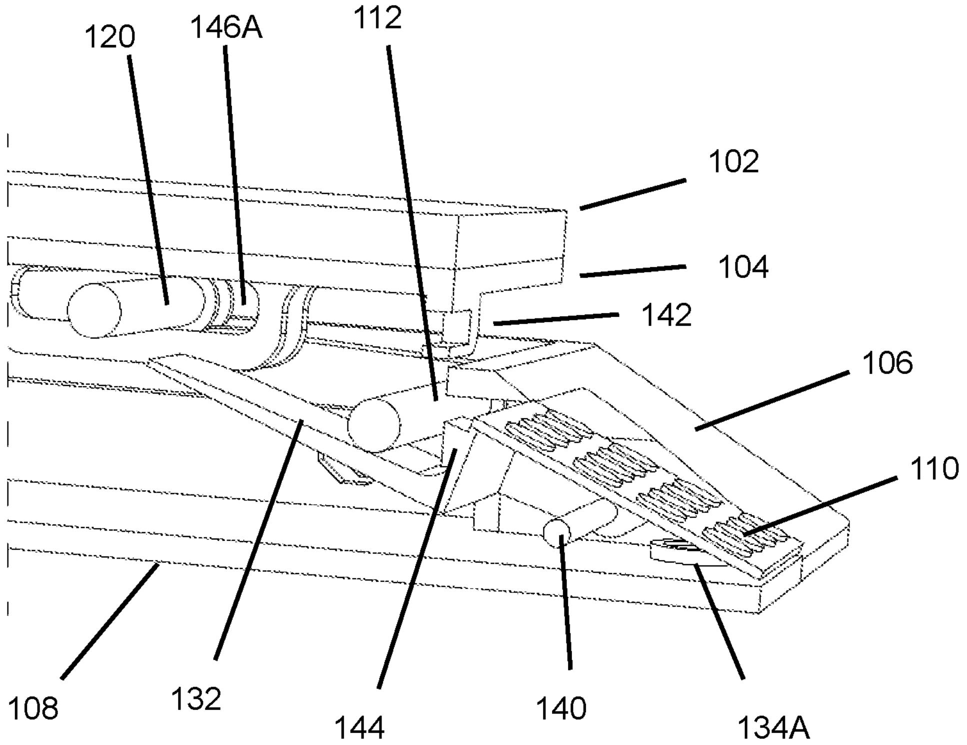
FIG. 8 illustrates a magnified side cutaway view of the elevating apparatus of FIG. 1 in the open (raised) position.

FIG. 8 shows a side cutaway view of elevating apparatus 100 wherein pedal 110 is pressed down and pedal plate 132 is raised accordingly. In this position, a user can press down on platform plate 104 to lower it, which has the effect of moving locking bar 112 in the direction of pedal 110 and into a different notch (of notches 136 which are not visible in this view). If the platform plate 104 is lowered to an intermediate level with a corresponding notch, then platform plate 104 can be secured in that position by releasing pedal 110 so that it raises up and pedal plate 132 lowers accordingly. If platform plate 104 is lowered to the lowest level, then locking bar 112 is moved to the notch closest to the pedal and locking hook is positioned proximate to protrusion 144.

Figure 9:
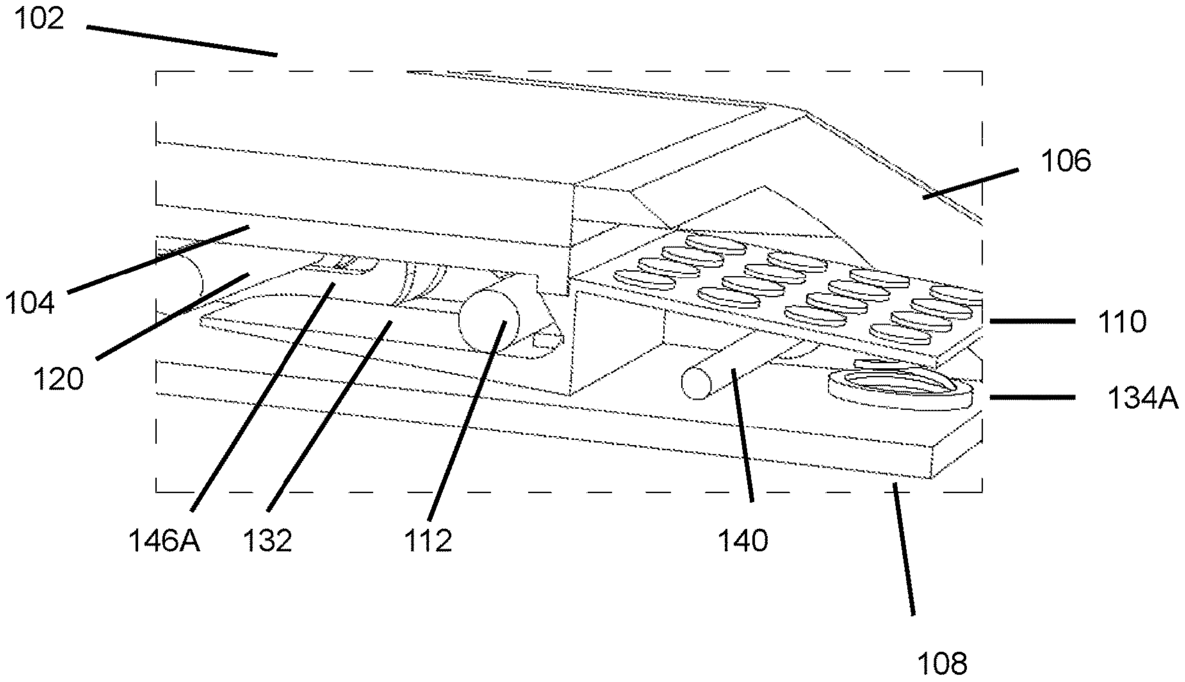
FIG. 9 illustrates a magnified side cutaway view of the elevating apparatus of FIG. 1 in the closed (compressed) position.

FIG. 9 shows a side cutaway view of elevating apparatus 100 in the fully compressed position. Platform plate 104 is at its lowest level, and step 110 has been released and positioned back to its resting position by first pedal spring 134A and second pedal spring 134B (not shown). In this position, locking hook 142 is engaged with protrusion 144, thereby securing platform plate 104 in place and preventing it from lifting or otherwise moving apart from base plate 108.

In operation, elevating apparatus 100 is preferably placed on a floor or other stable surface and is in the compressed position with locking hook 142 engaged with protrusion 144. In this position, elevating apparatus 100 resembles a simple floor mat (with or without overlying cushion), with beveled sides to help prevent tripping and with platform surface 102 and base cushion 106 visible to the user. The user may stand on elevating apparatus 100 in this position as they would with a simple floor mat. When the user desires a raised platform, the user steps on pedal plate 110, pushing it downward. That action removes protrusion 144 from locking hook 142 and lifts pedal plate 132, thereby freeing locking bar 112 to move laterally. Gas cylinder assembly 128 exerts an expanding force, thereby pushing platform plate 104 apart from base plate 108 and causing platform plate 104 to rise. Once platform plate 104 has risen to the desired position, the user releases pedal 110 and allows first pedal spring 134A and second pedal spring 134B to raise pedal 110 upward. At the same time, pedal plate 132 is lowered, which allows locking bar 112 to lower into one of the notches 136. At this point, locking bar 112 is secured in place, and platform plate 104 is secured in place. The user may then step onto platform surface 102.

When the user desires to collapse elevating apparatus 100, the user must first step off and remove all weight from platform surface 102. This de-weighting is a safety precaution to prevent inadvertent or unintentional retraction of the platform plate 104. The user then steps (or otherwise presses) down on pedal 110. This has the effect of raising pedal plate 132, which lifts locking bar 112 out of its notch and allows it to move laterally. Because gas cylinder assembly may have a built-in dampener that tends to resist compression, the user may need to press down gently on platform surface 102 to lower it to the desired position. If the user desires to collapse elevating apparatus 100 entirely, the user presses down until platform surface 102 is flush with base cushion 106. The user then releases pedal 110, which correspondingly lowers pedal plate 132 and allows locking bar 112 to move into the notch closest to pedal 110. As the pedal 110 is released, protrusion 144 engages with locking hook 142, thereby locking platform plate 104 in place. Elevating apparatus 100 is then secured in the collapsed position.

Figure 10A:
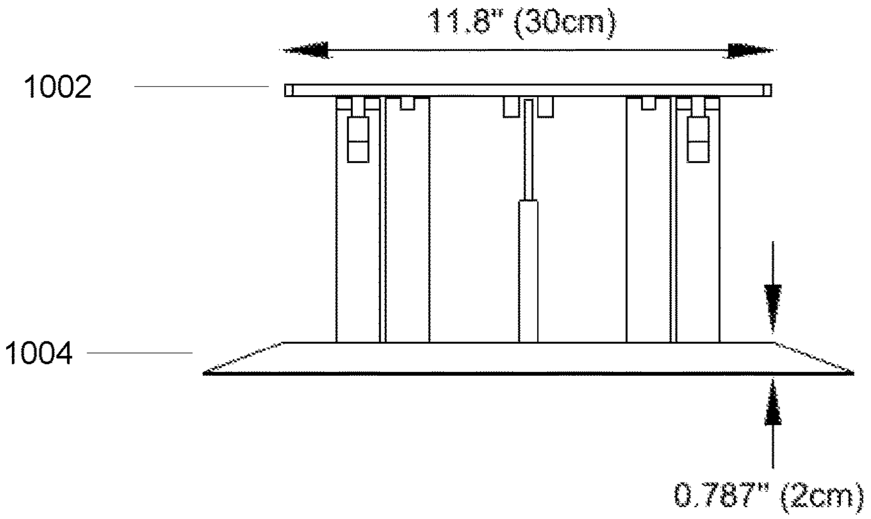
FIGS. 10A, 10B, and 10C illustrate an embodiment of an elevating apparatus in accordance with the principles disclosed herein with example dimensions shown in an end view, a side view, and a top view, although it should be understood that the elevating apparatus could be made in a wide variety of shapes and sizes.
Figure 10B:
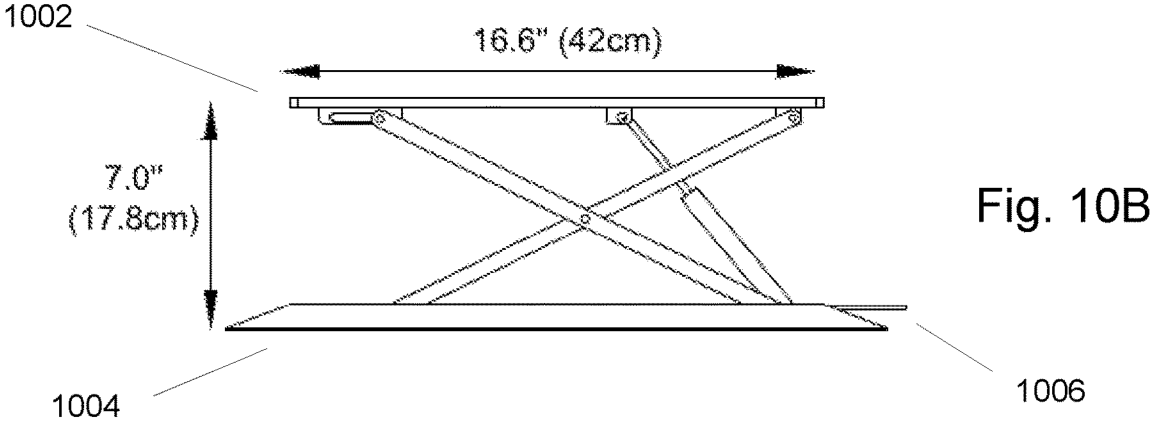
Figure 10C:
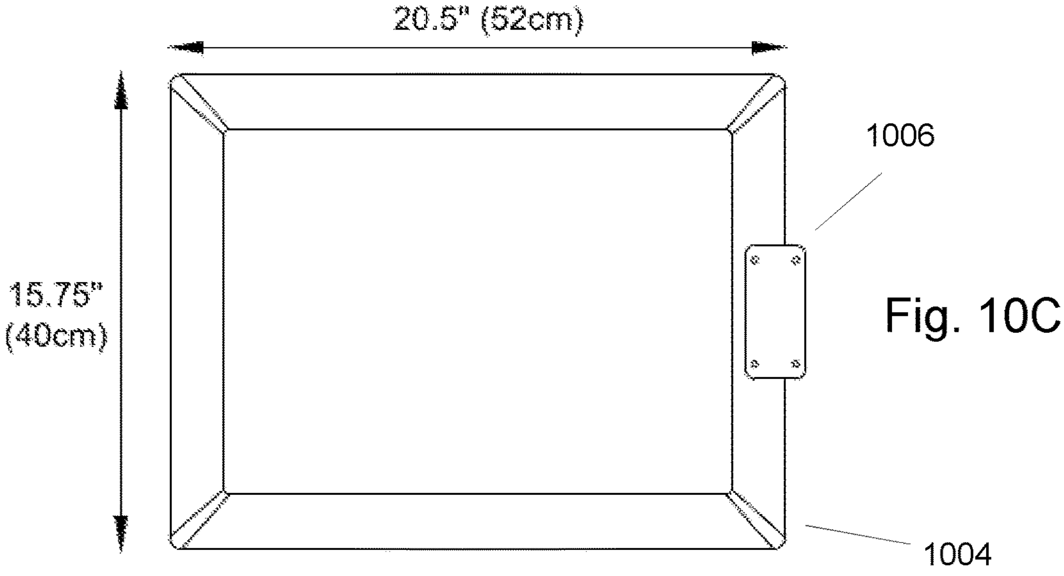

FIGS. 10A-10C depict dimensions of one non-limiting example of an elevating apparatus in accordance with the principles disclosed herein. In this example, elevating apparatus 1000 comprises a platform plate 1002 that is 11.8 inches (30 cm) in width and 16.6 inches (42 cm) in length. Base cushion 1004, at its widest points, measures 15.75 inches (40 cm) in width and 20.5 inches (52 cm) in length. In the fully raised position, platform plate 1002 is separated from the bottom surface of base cushion 1004 by 7.0 inches (17.8 cm). Also shown for reference is pedal 1006.

While the elevating apparatus depicted in FIG. 10 is shown with specific dimensions, it should be understood that an elevating apparatus may have larger or smaller dimensions without departing from the principles disclosed herein. It is specifically contemplated that some smaller embodiments of an elevating apparatus, such as for use by children in a bathroom setting, may have a width of 8 inches (20 cm) to 16 inches (41 cm), a length of 8 inches (20 cm) to 20 inches (51 cm), a height of one inch (2.5 cm) to 4 inches (10 cm) in the compressed position, and a height of 4 inches (10 cm) to 10 inches (25 cm) in the raised position. It is contemplated that some larger embodiments of an elevating apparatus, such as for use by a doctor in an operating room setting, may have a width of 16 inches (41 cm) to 30 inches (76 cm), a length of 20 inches (51 cm) to 60 inches (152 cm), a height of one inch (2.5 cm) to 8 inches (20 cm) in the compressed position, and a height of 8 inches (20 cm) to 30 inches (76 cm) in the raised position. Larger dimensions, smaller dimensions, and different proportions may be implemented while incorporating the principles disclosed herein.

Figure 11:
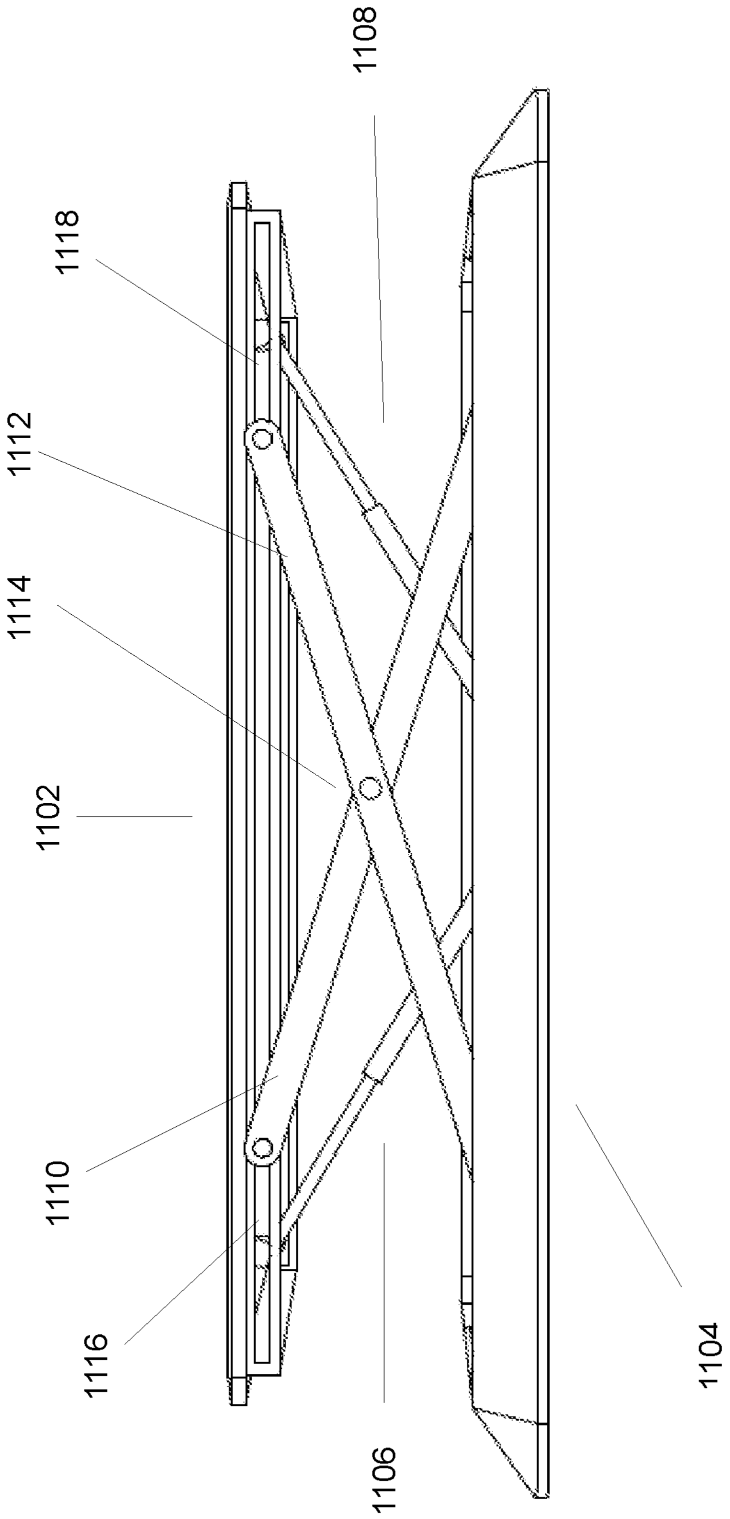
FIG. 11 illustrates an elevating apparatus incorporating two gas cylinder assemblies.

FIG. 11 shows an elevating apparatus 1100 comprising a platform 1102 supported by base 1104. First gas cylinder assembly 1106 and second gas cylinder assembly 1108 press upward on platform 1102. First arm 1110 is rotatably coupled to base 1104 and slidably coupled to platform 1102 along first sliding track 1116. Second arm 1112 is rotatably coupled to base 1104 and slidably coupled to platform 1102 along second sliding track 1118. First arm 1110 and second arm 1112 are rotatably coupled at arm hinge 1114. Not shown are complementary arms on the rear side of elevating apparatus 1100 to provide stability to platform 1102.

Figure 12A:
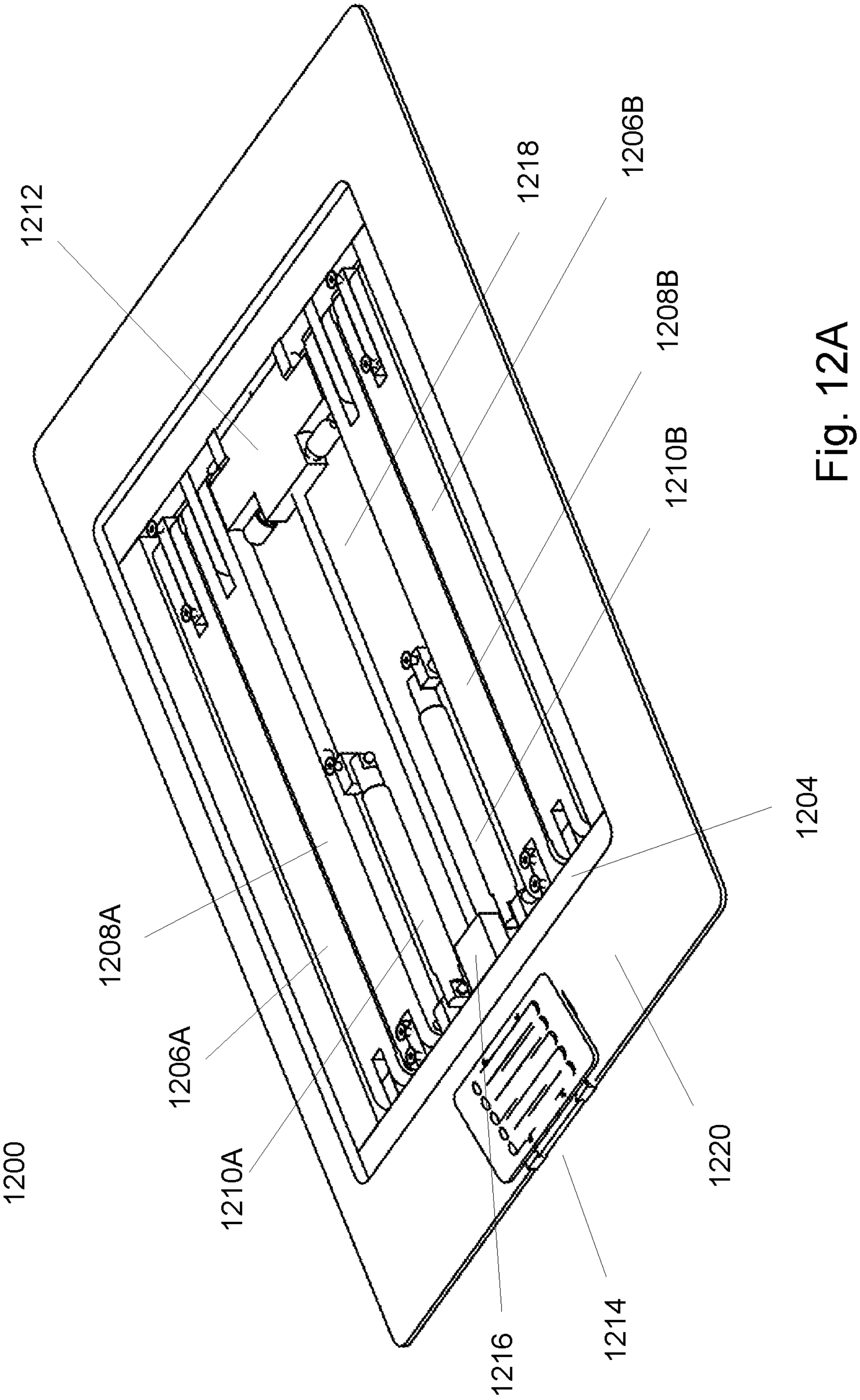
FIGS. 12A and 12B illustrate an elevating apparatus with a mechanical lock. In the embodiment shown, the mechanical struts and hinges attach directly to an outer rigid frame.
Figure 12B:
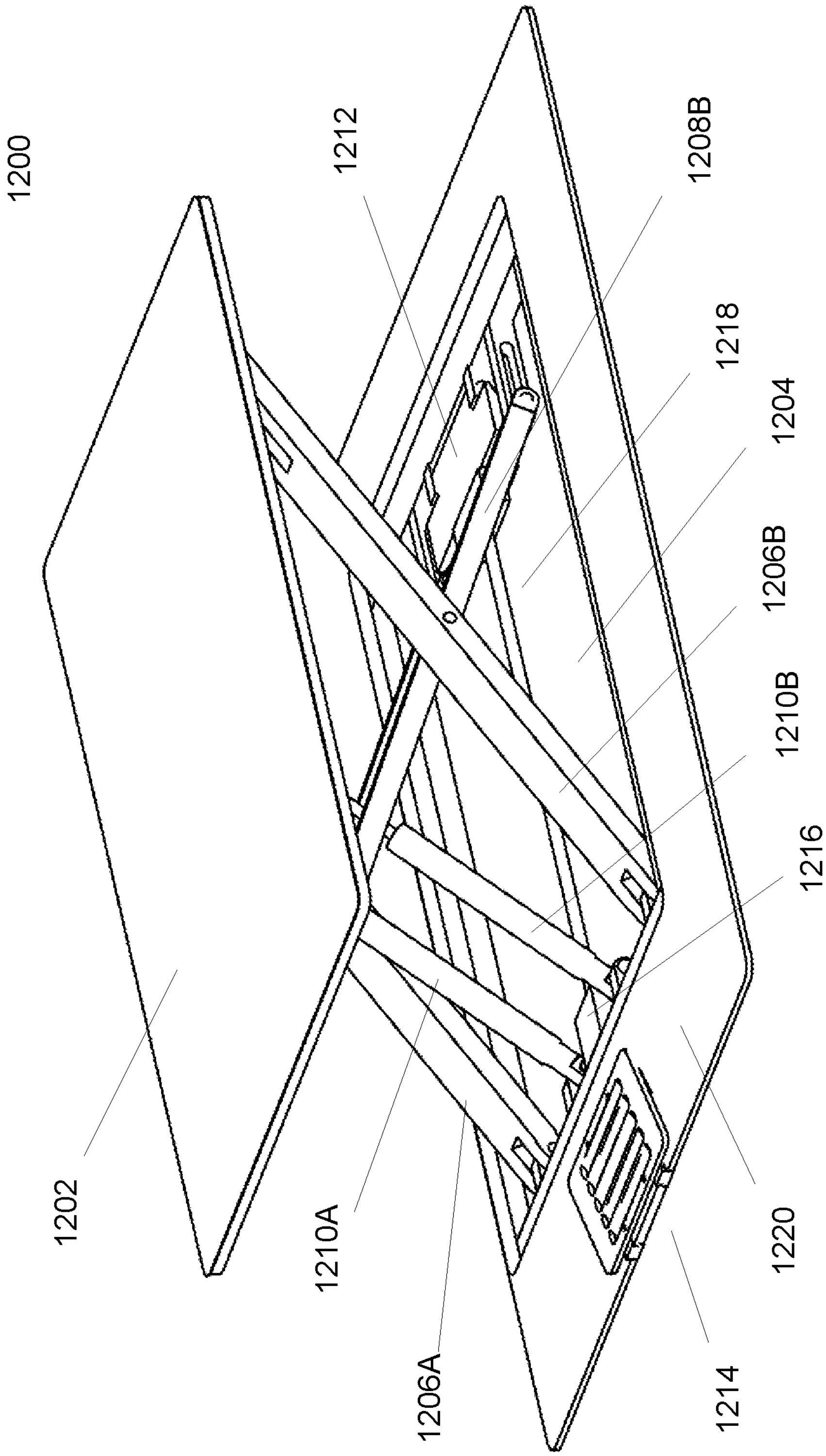

FIG. 12A shows an elevating apparatus 1200 with platform plate 1202 omitted from view for ease of reference to the interior components. Base 1204 is encircled by base cushion 1220 and is rotatably coupled to each of first outer arm 1206A, second outer arm 1206B, first gas cylinder assembly 1210A, and second gas cylinder assembly 1210B. Base 1204 is slidably coupled to first inner arm 1208A and second inner arm 1208B. Pedal 1214 is coupled to pedal box 1216 which controls mechanical lock 1212. FIG. 12B shows elevating apparatus 1200 in the raised position in which platform 1202 is supported by first outer arm 1206A, second outer arm 1206B, first inner arm 1208A, and second inner arm 1208B. Mechanical lock 1212 secures first inner arm 1208A and second inner arm 1208B in position with respect to base 1204. In the embodiment shown, pressing on pedal 1214 mechanically engages pedal box 1216, which moves connector 1218, triggering mechanical lock to allow first inner arm 1208A and second inner arm 1208B to slide with respect to base 1204. This allows platform 1202 to either rise due to pressure from first gas cylinder assembly 1210A and second gas cylinder assembly 1210B or to be lowered back to the compressed position. In some embodiments, an electromechanical means may be used such that pressing or releasing pedal 1214 triggers an electrical response in pedal box 1216 which signals mechanical lock 1212 to secure or release first inner arm 1208A and second inner arm 1208B.

Figure 13A:
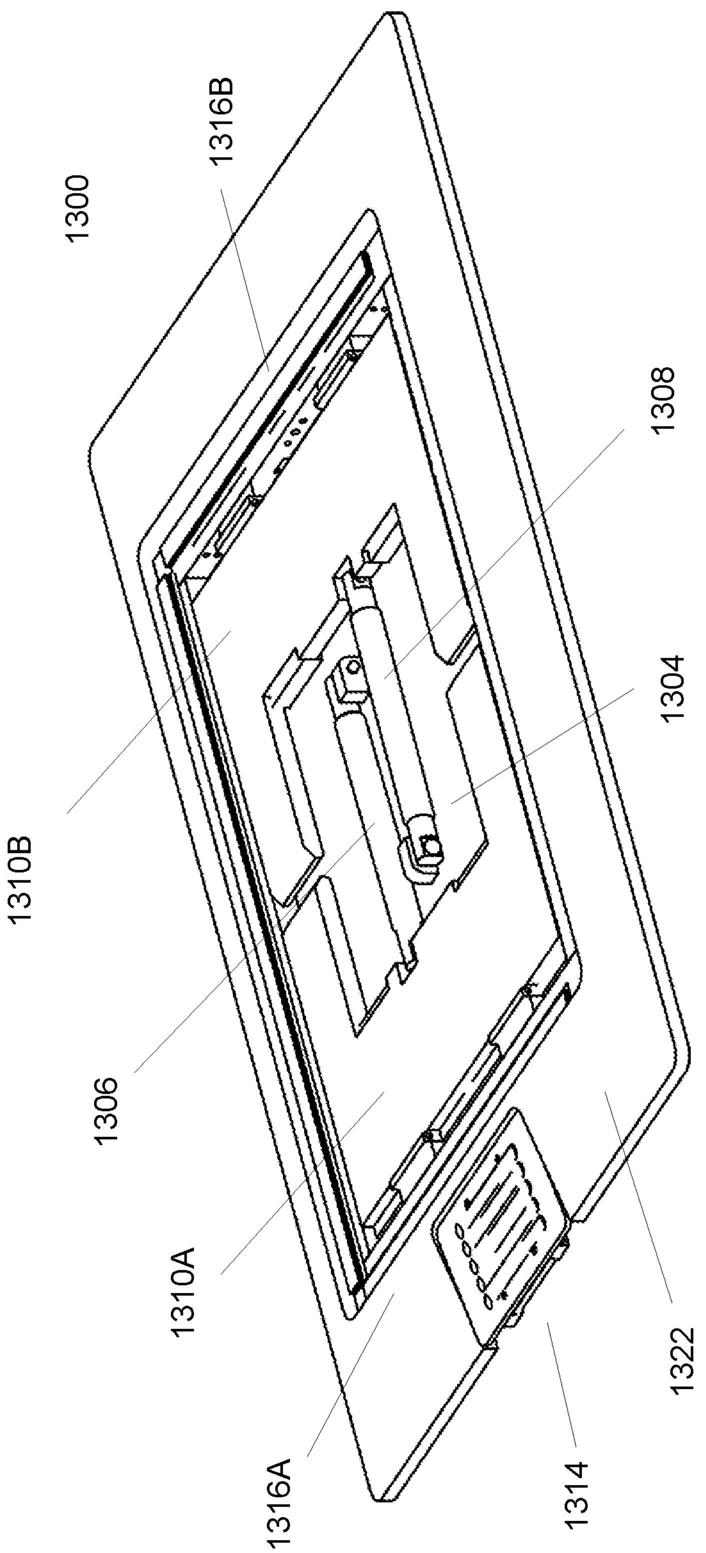
FIGS. 13A, 13B, and 13C illustrate an elevating apparatus with hinged walls. In the embodiment shown, the structural supports are attached directly to a rigid outer frame, and an outer accordion-type skirt or protective covering may be used to conceal the mechanical parts under the platform.

FIG. 13A shows an elevating apparatus 1300 with platform plate 1302 omitted from view for ease of reference to the interior components. A first gas cylinder assembly 1306 is rotatably coupled to base 1304 and first hinged wall 1310A. Second gas cylinder assembly 1308 is rotatably coupled to base 1304 and second hinged wall 1310B. First curtain 1316A and second curtain 1316B are shown in their compressed positions. Also shown are pedal 1314 and base cushion 1322.

Figure 13B:
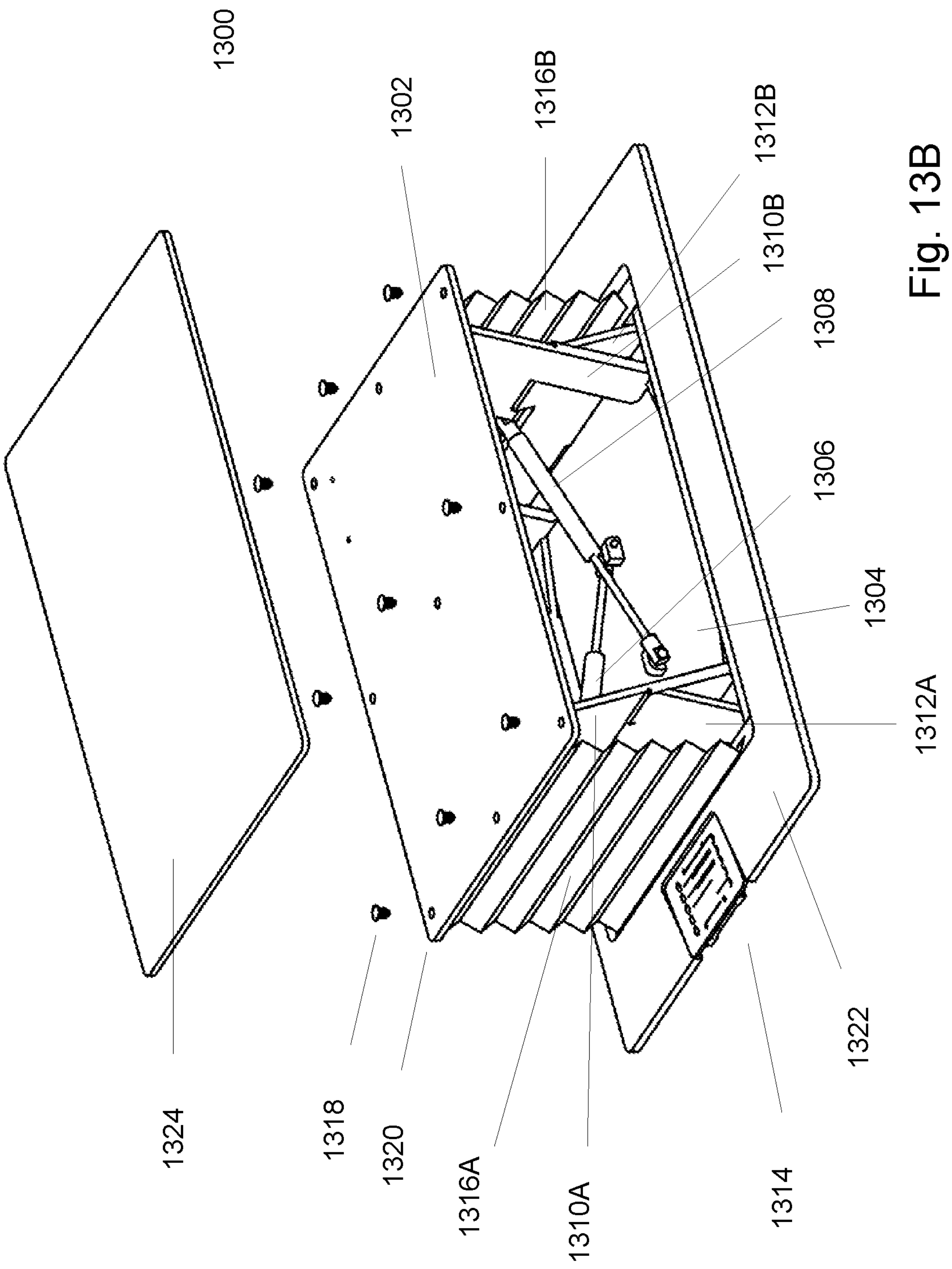
Figure 13C:
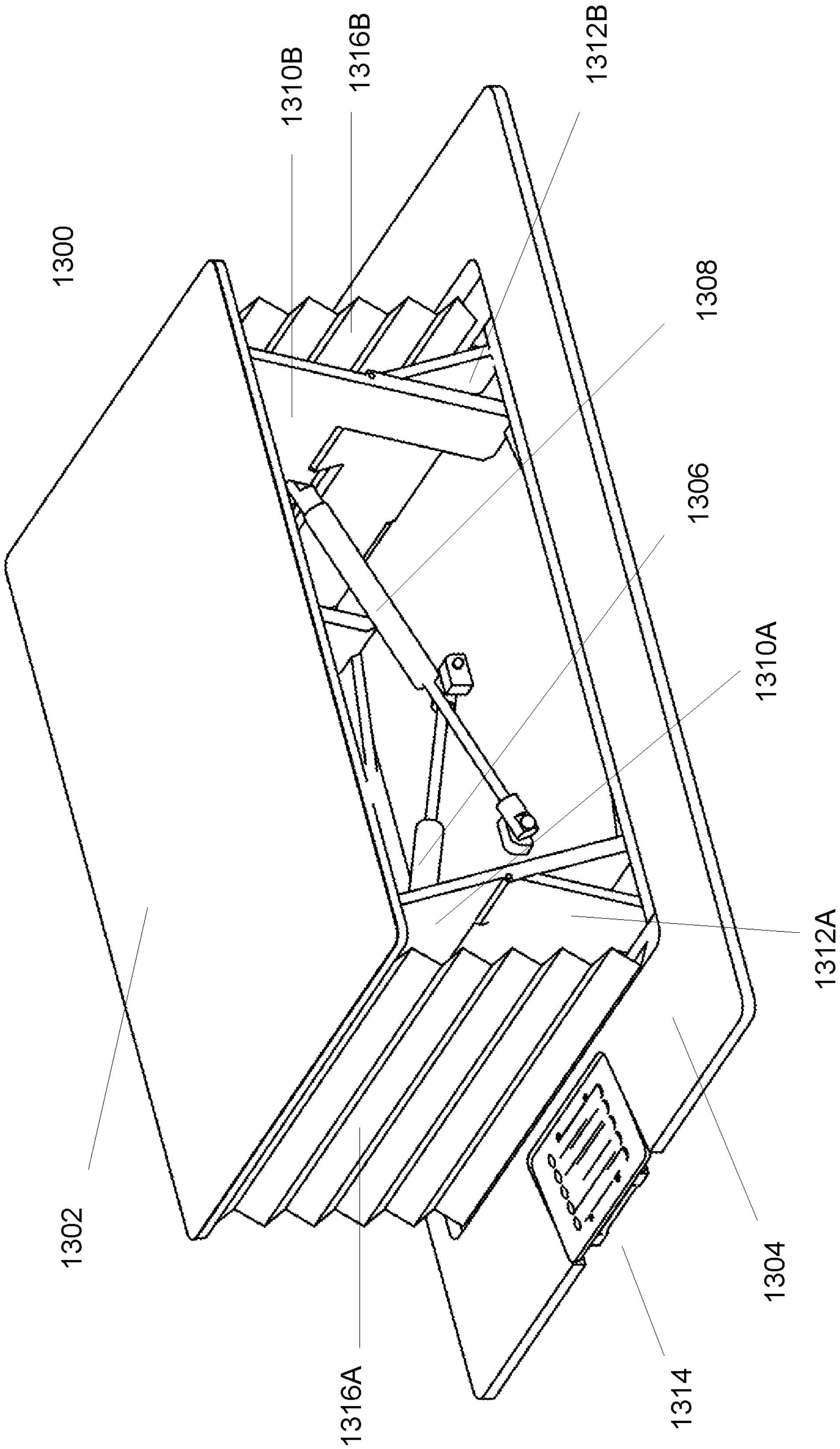

FIG. 13B shows elevating apparatus 1300 in the raised position with platform cushion 1324 removed from platform plate 1302. During assembly, platform cushion 1324 is secured to platform plate 1302 with mounting screws 1318 and corresponding mounting holes 1320. In some embodiments, snaps or other fastening devices or means may be used in place of (or in addition to) mounting screws. As shown in FIGS. 13B and 13C, with elevating apparatus 1300 in the raised position, first gas cylinder assembly 1306 and second gas cylinder assembly 1308 are each extended. Platform plate 1302 is supported on one side by first hinged wall 1310A and first support leg 1312A. Platform plate 1302 is supported on the other side by second hinged wall 1310B and second support leg 1312B. If utilized as an option, first curtain 1316A and second curtain 1316B are extended and shield the interior of elevating apparatus 1300, providing an aesthetic alternative and providing at least some protection to the interior from debris or other harmful elements.

Figure 14A:
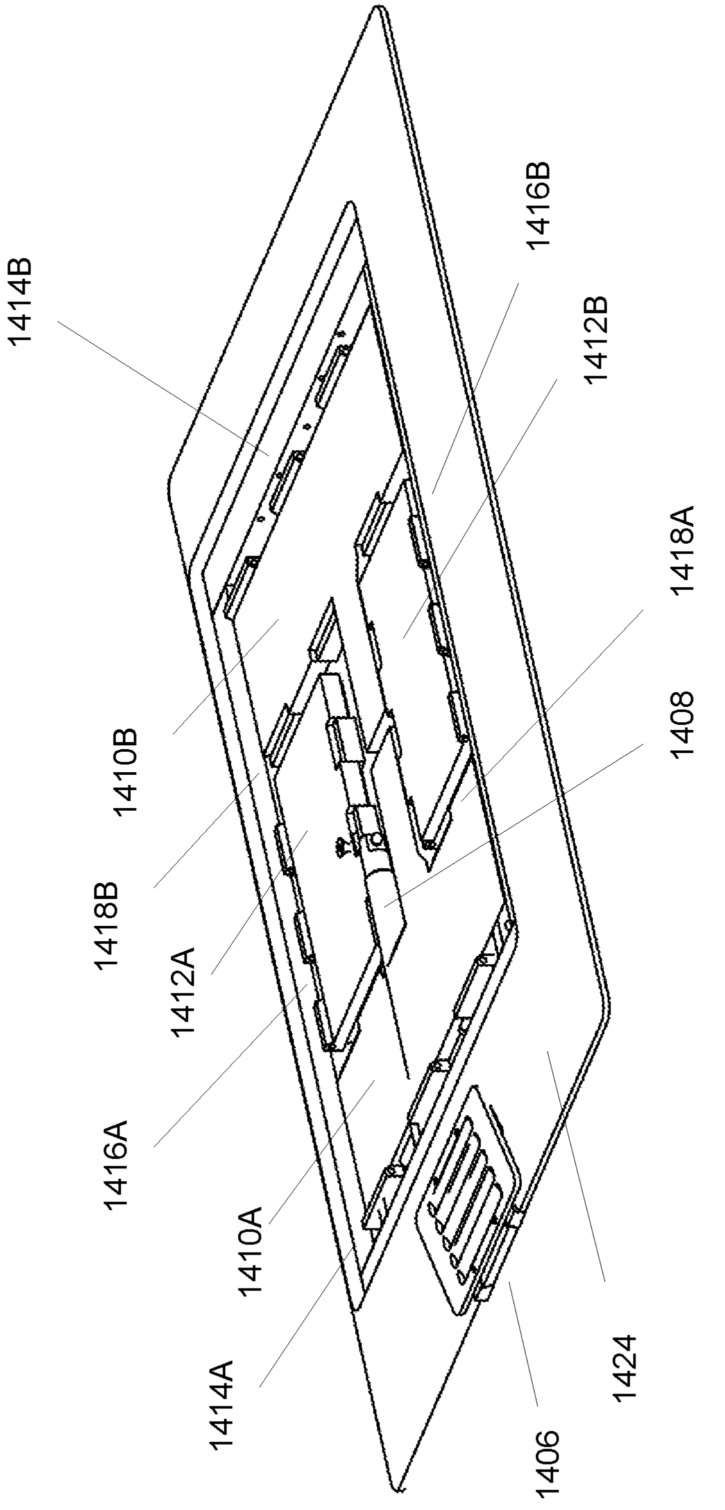
FIGS. 14A, 14B, and 14C illustrate an elevating apparatus with four hinged walls.

FIG. 14A shows elevating apparatus 1400 without a platform plate to better illustrate the interior components. Shown in this view are first hinged end wall 1410A, second hinged end wall 1410B, first hinged side wall top panel 1412A, first side wall hinge 1416A, second hinged side wall top panel 1412B, second side wall hinge 1416B, and gas cylinder assembly 1408. Pedal 1406 and base cushion 1424 are coupled to base plate 1404 (not visible).

Figure 14B:
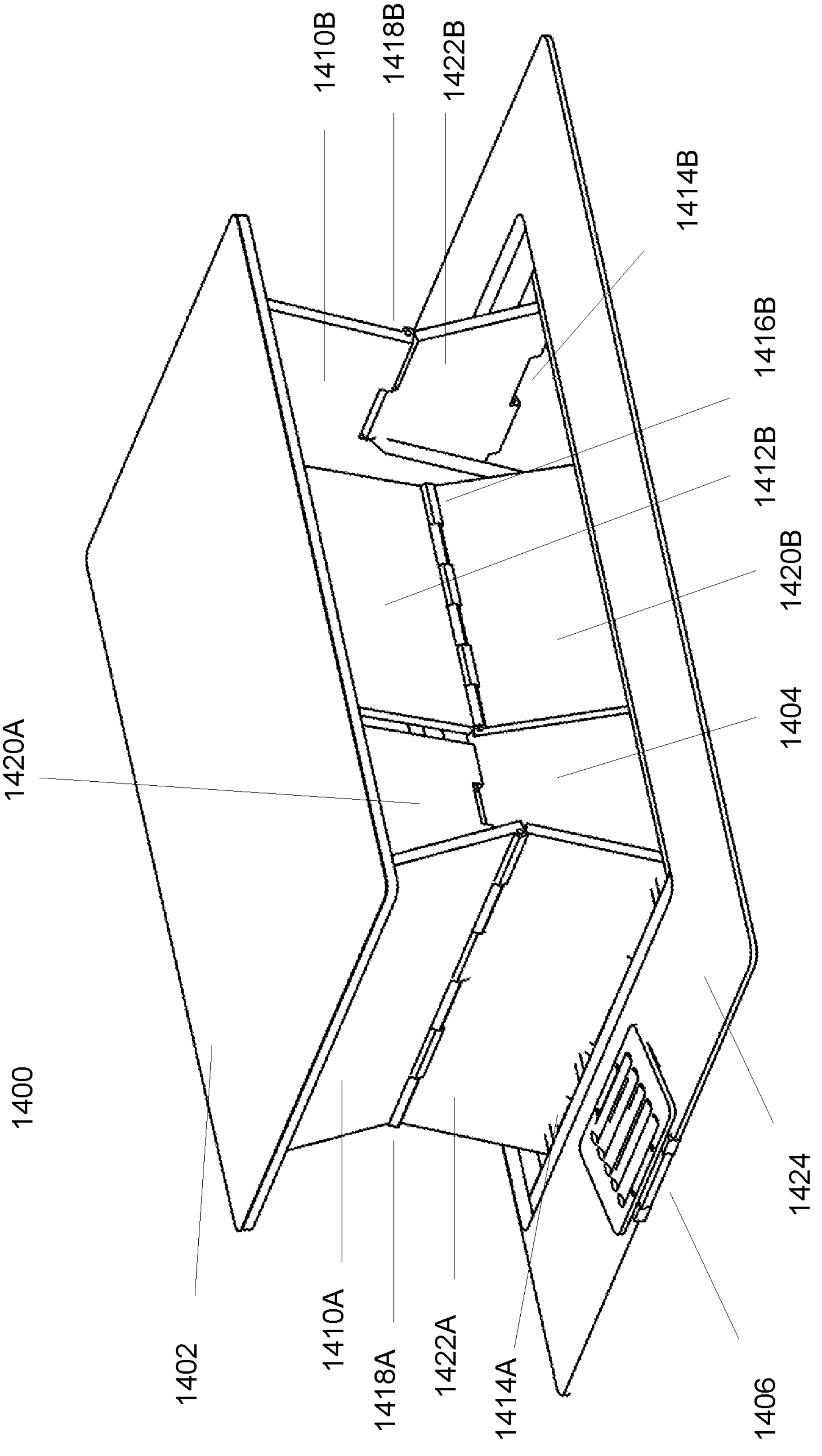

FIG. 14B shows elevating apparatus 1400 with platform plate 1402 in a raised position. In this state, platform plate 1402 is supported by first hinged end wall 1410A, second hinged end wall 1410B, first hinged side wall top panel 1412A (not visible), and second hinged side wall top panel 1412B. First hinged end wall 1410A is coupled to first end wall lower panel 1422A at first support leg hinge 1418A, and second hinged end wall 1410B is coupled to second end wall lower panel 1422B at second support leg hinge 1418B. First end wall lower panel 1422A is coupled to base plate 1404 at first end wall hinge 1414A, and second end wall lower panel 1422B is coupled to base plate 1404 at second end wall hinge 1414B. First hinged side wall top panel 1412A (not visible) is coupled to first hinged side wall bottom panel 1420A at first side wall hinge 1416A (not visible), and second hinged side wall top panel 1412B is coupled to second hinged side wall bottom panel 1420B at second side wall hinge 1416B. First hinged side wall bottom panel 1420A and second hinged side wall bottom panel 1420B are each coupled to base plate 1404 via hinges as well.

Figure 14C:
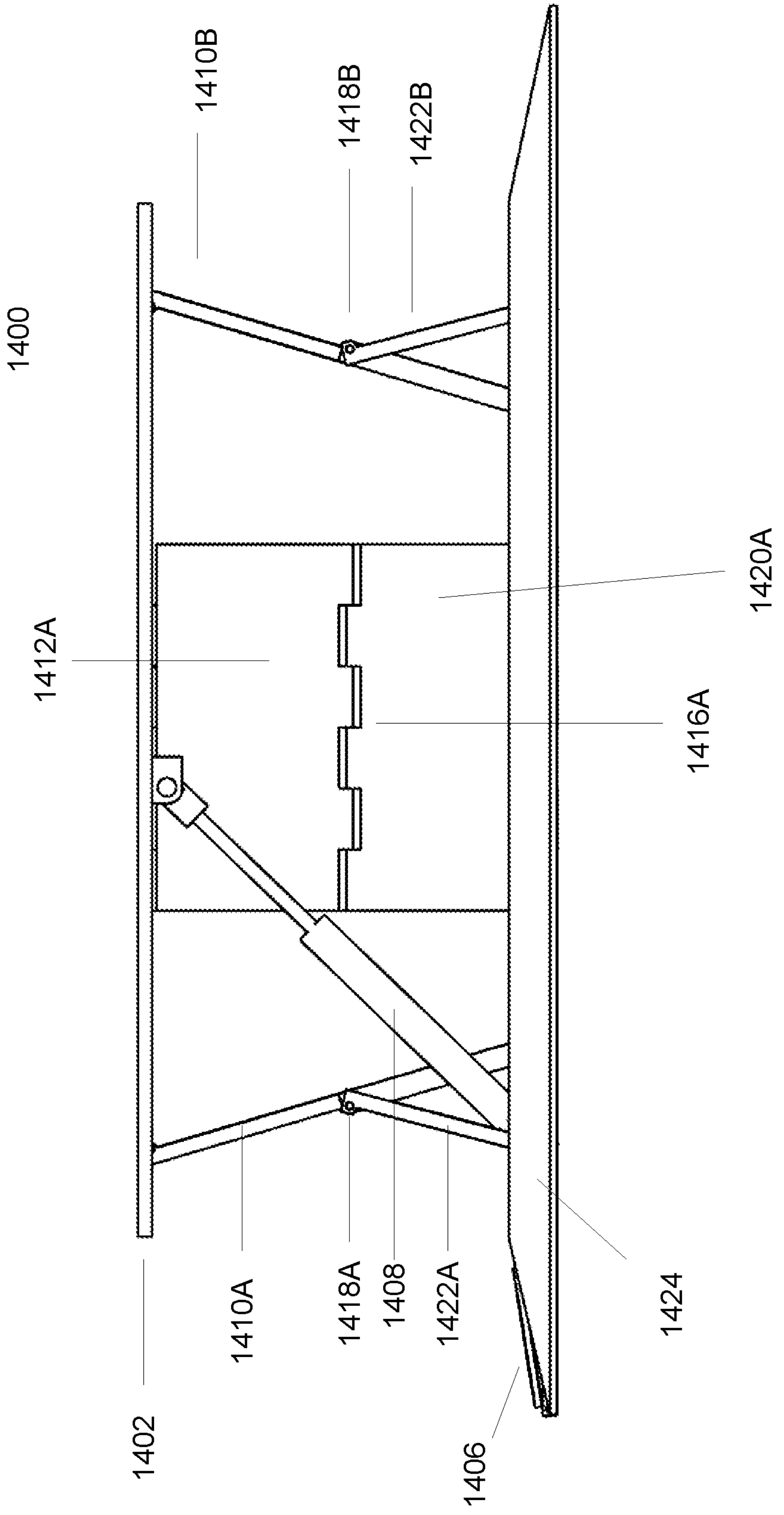

FIG. 14C shows a side view of elevating apparatus 1400 in the raised position with second hinged side wall top panel 1412B and second hinged side wall bottom panel 1420B removed to better illustrate the remaining components. In this position, gas cylinder assembly 1408 is extended. First hinged end wall 1410A is structurally supported by first end wall lower panel 1422A, and second hinged end wall 1410B is structurally supported by second end wall lower panel 1422B. First end wall lower panel 1422A is coupled to base plate 1404 at first end wall hinge 1414A, and second end wall lower panel 1422B is coupled to base plate 1404 at second end wall hinge 1414B.

Figure 15A:
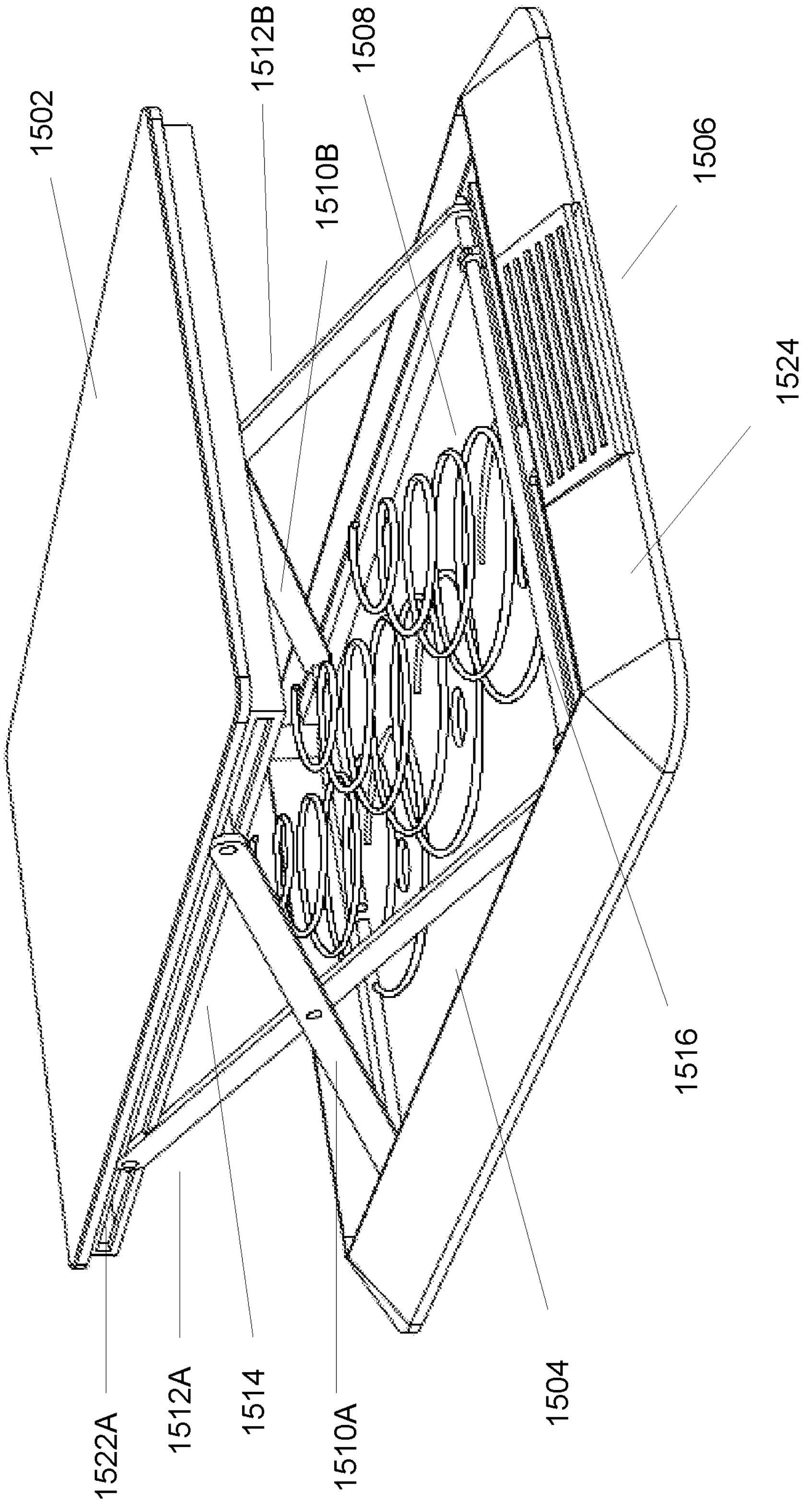
FIGS. 15A and 15B illustrate a perspective view and a magnified view of an elevating conical spring-activated apparatus incorporating an actuating mechanism in the form of a cross bar coupled to a pedal.

FIG. 15A depicts elevating apparatus 1500 in a raised position. Platform plate 1502 is supported by first outer arm 1510A and first inner arm 1512A, both of which engage in first track 1522A. Platform plate 1502 is also supported by second outer arm 1510B and second inner arm 1512B, both of which engage in a second track (not visible). First inner arm 1512A and second inner arm 1512B are each coupled to cross bar 1516. Springs 1508 provide an upward force when the platform plate 1502 is in a lowered or compressed position. As shown, springs 1508 are not coupled to platform plate 1502, but in some embodiments, springs 1502 may be coupled to platform plate 1502. In the embodiment shown, base cushion 1524 is coupled to base plate 1504.

Figure 15B:
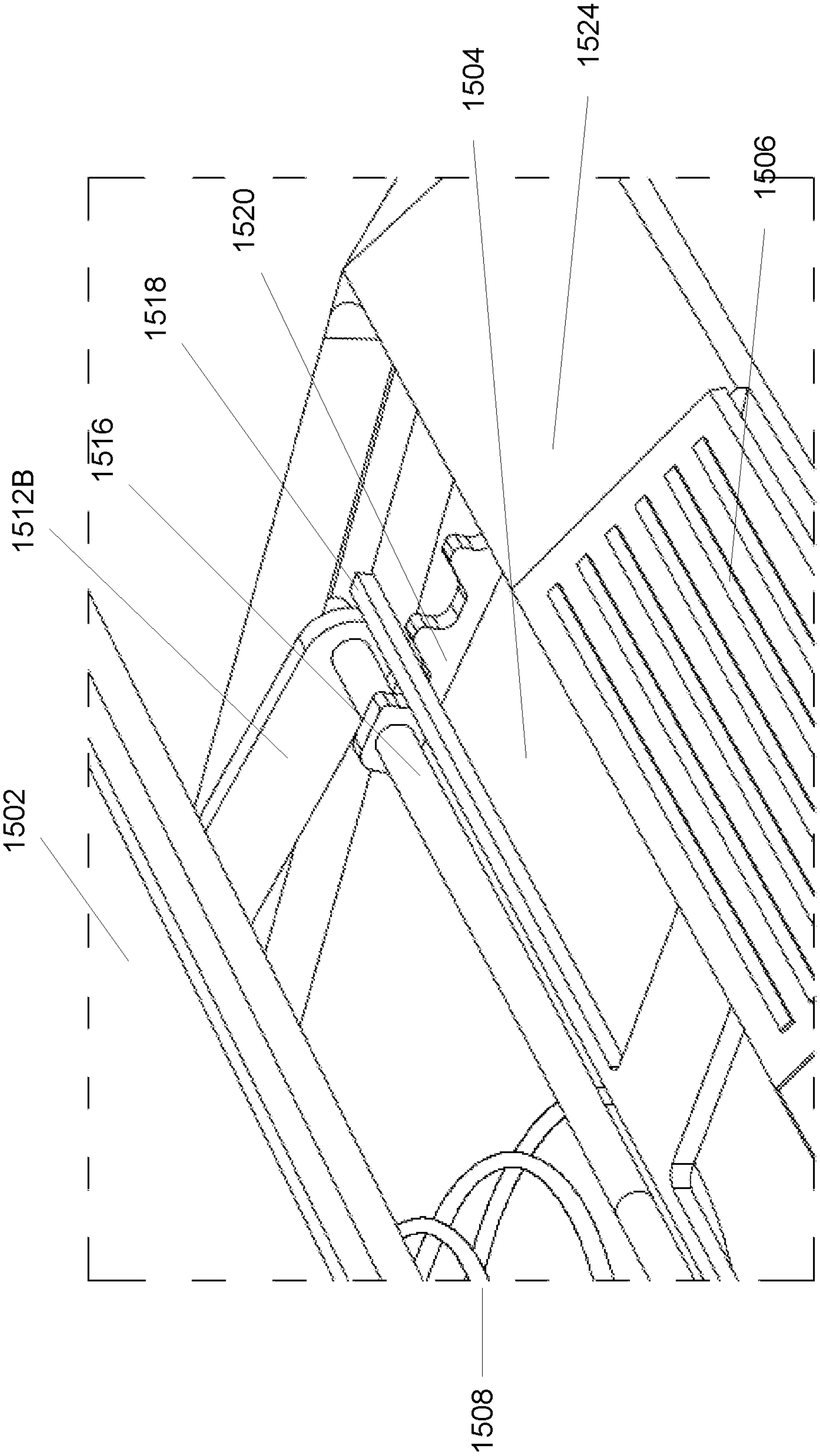

FIG. 15B shows a close up view of one corner of elevating apparatus 1500. In this view, pedal 1506 is raised, which results in locking bar 1518 sitting in one of notches 1520, thereby holding cross bar 1516 in place. In this state, first inner arm 1512A and second inner arm 1512B, each of which is coupled to cross bar 1516, are both secured in place, and thus platform plate 1502 is secured in the raised position. When pedal 1506 is pressed down, locking bar 1518 is raised upward out of the notches 1520. This allows cross bar 1516 to move laterally, thereby moving first inner arm 1512A and second inner arm 1512B and lowering platform plate 1502. Once platform plate 1502 reaches the desired position corresponding to one of notches 1520, pedal 1506 may be released to raise again, thereby lowering locking bar 1518 into a corresponding one of notches 1520. Platform plate 1502 will then be secured in place.

Figure 16A:
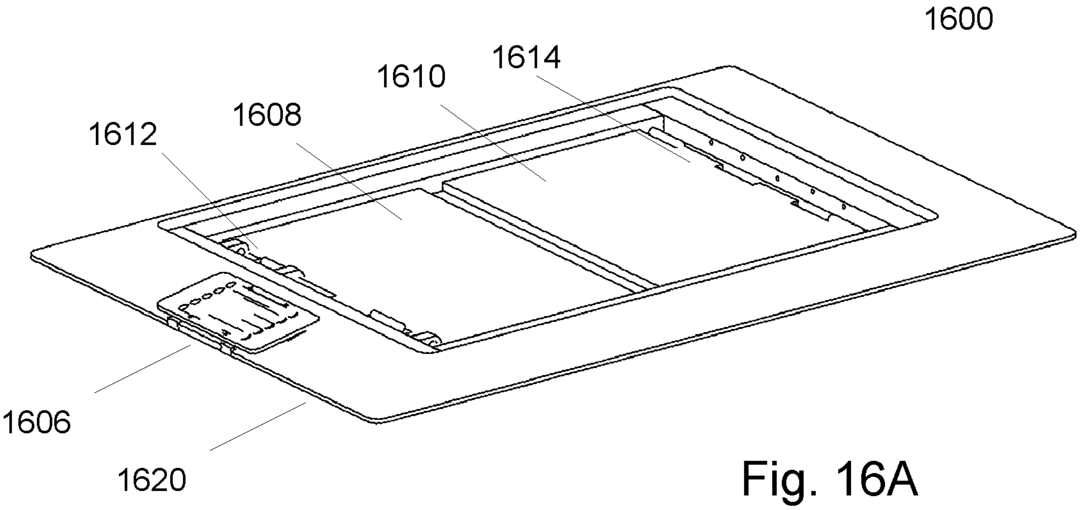
FIGS. 16A and 16B illustrate an elevating apparatus with hinged walls.

FIG. 16A shows elevating apparatus 1600 with platform plate 1602 removed.

Figure 16B:
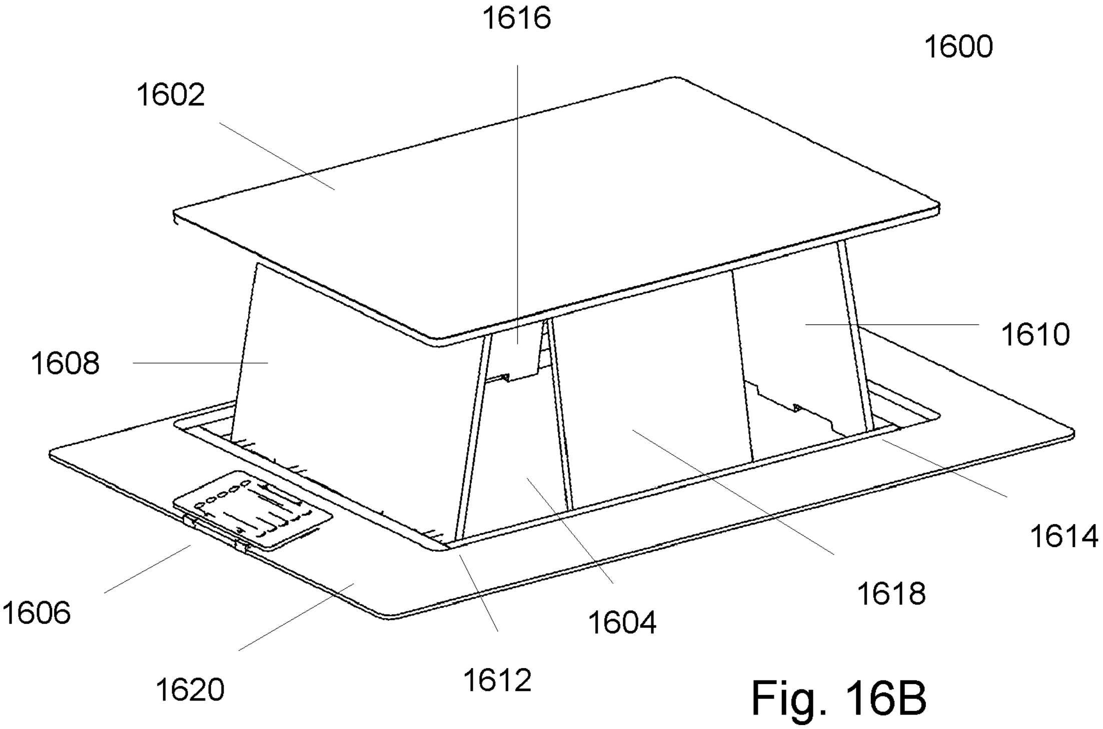

First end wall 1608 is coupled to base plate 1604 (not visible) at first hinge 1612, and second end wall 1610 is coupled to base plate 1604 at second hinge 1614. FIG. 16B shows elevating apparatus 1600 in a raised position, in which platform plate 1602 is supported by first end wall 1608, second end wall 1610, first side wall 1616, and second side wall 1618. Pedal 1606 is used to release platform plate 1602 so that it can be raised or lowered. As shown, base cushion 1620 is coupled to base plate 1604. In the embodiment shown, first end wall 1608 and second end wall 1610 are slidably coupled to platform plate 1602. First side wall 1616 and second side wall 1618 support platform plate 1602 when it is in the raised position. When lowering platform plate 1602, first side wall 1616 and second side wall 1618 are disengaged from platform plate 1602 and folded downward before first end wall 1608 and second end wall 1610 are rotated downward. In the embodiment shown, first hinge 1612 and second hinge 1614 are biased to rotate first end wall 1608 and second end wall 1610 upward, respectively. First side wall 1616 and second side wall 1618 may be coupled to base plate via hinges that are biased to rotate first side wall 1616 and second side wall 1618 upward, respectively. Alternate embodiments may employ one or more springs, one or more gas cylinder assemblies, one or more motors, and/or other appropriate means for generating a force to raise platform plate 1602.

Figure 17A:
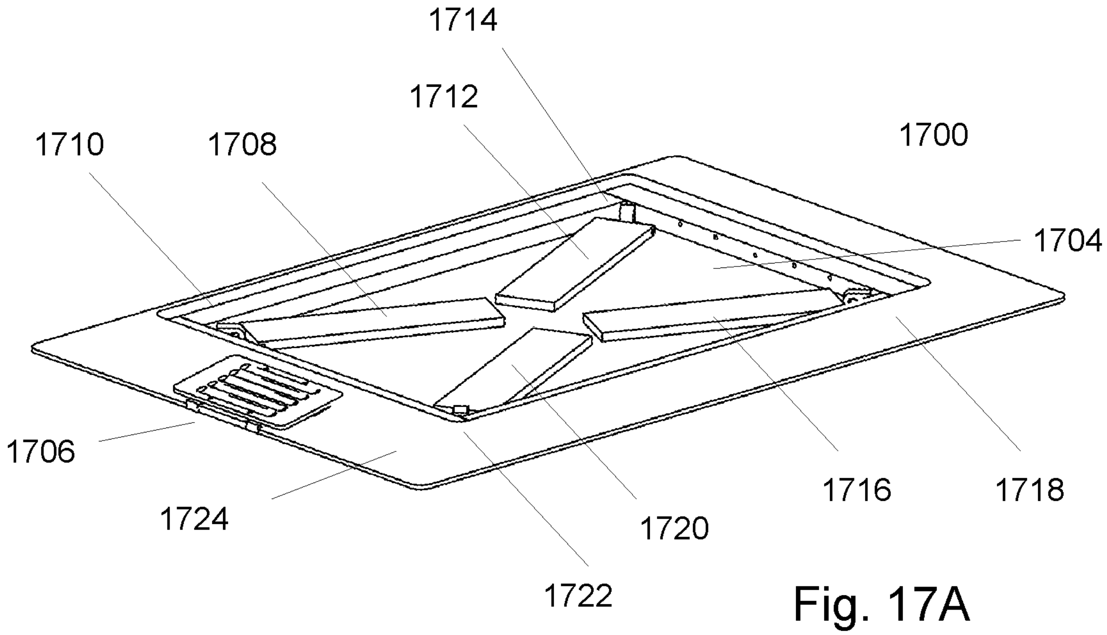
FIGS. 17A and 17B illustrate an elevating apparatus with hinged struts.
Figure 17B:
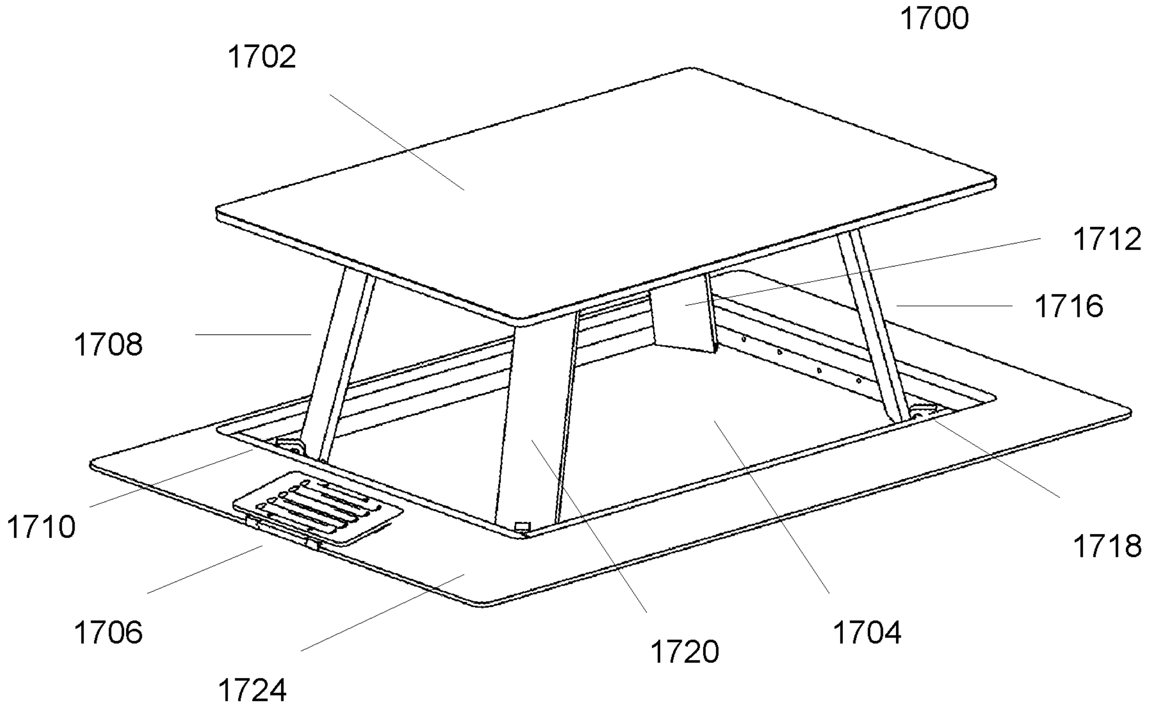

FIG. 17A shows elevating apparatus 1700 with platform plate 1702 removed. First strut 1708 is coupled to base plate 1704 at first hinge 1710, second strut 1712 is coupled to base plate 1704 at second hinge 1714, third strut 1716 is coupled to base plate 1704 at third hinge 1718, and fourth strut 1720 is coupled to base plate 1704 at fourth hinge 1722. FIG. 17B shows elevating apparatus 1700 in a raised position, in which platform plate 1702 is supported by first strut 1708, second strut 1712, third strut 1716, and fourth strut 1720. Pedal 1706 is used to release platform plate 1702 so that it can be raised or lowered. As shown, base cushion 1724 is coupled to base plate 1704. In the embodiment shown, first strut 1708, second strut 1712, third strut 1716, and fourth strut 1720 are each slidably coupled to platform plate 1702. In the embodiment shown, first hinge 1710, second hinge 1714, third hinge 1718, and fourth hinge 1722 are biased to rotate first strut 1708, second strut 1712, third strut 1716, and fourth strut 1720 upward, respectively. Alternate embodiments may employ one or more springs, one or more gas cylinder assemblies, one or more motors, and/or other appropriate means for generating a force to raise platform plate 1702.

Figure 18:
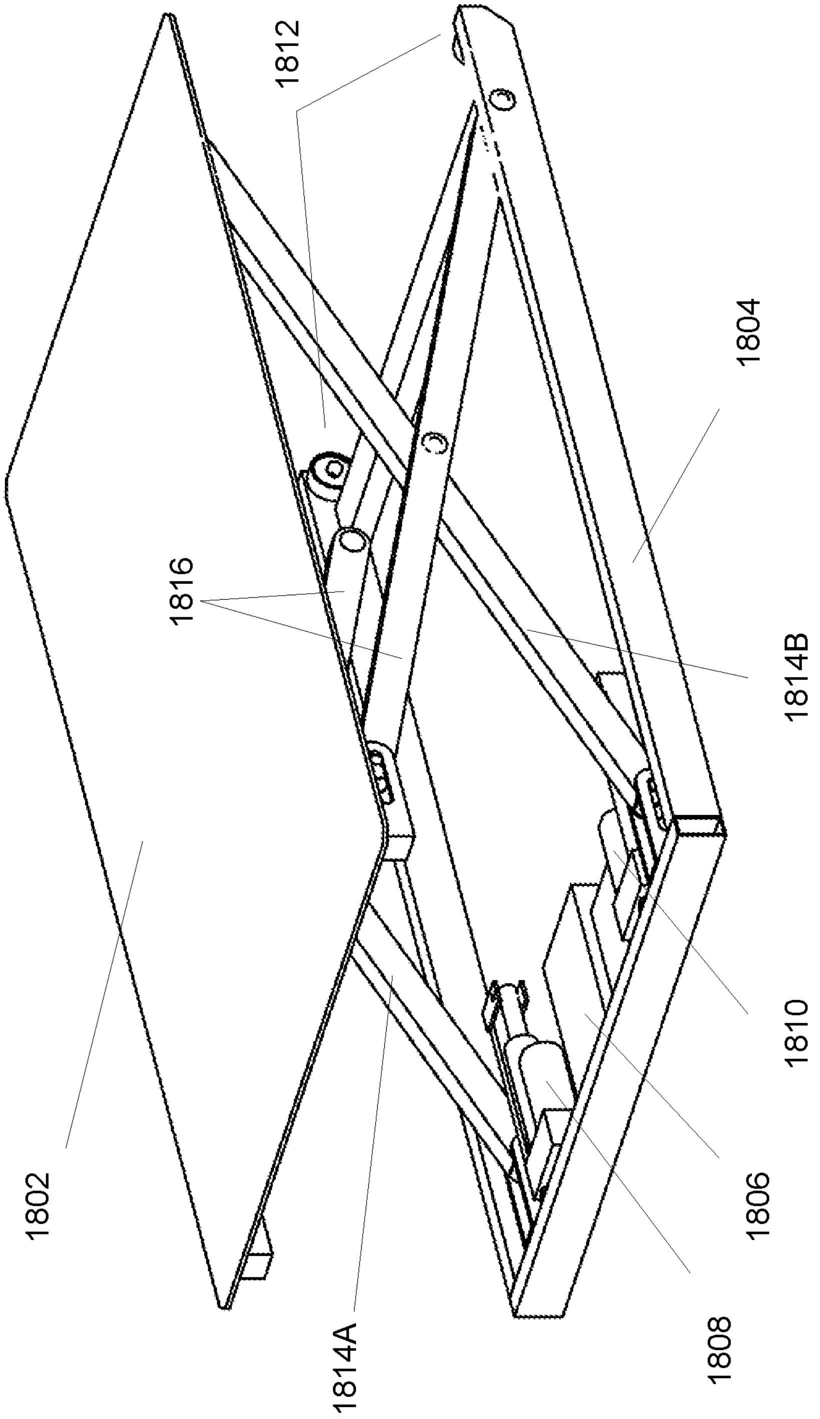
FIG. 18 illustrates an elevating apparatus incorporating a battery pack, and two motors.

FIG. 18 shows elevating apparatus 1800 in which platform plate 1802 is rotatably coupled to first inner arm 1814A and second inner arm 1814B and slidably coupled to outer arms 1816. Outer arms 1816 are rotatable coupled to base frame 1804. First inner arm 1814A is slidably coupled to base frame 1804 and is coupled to first motor 1808. Second inner arm 1814B is slidably coupled to base frame 1804 and is coupled to second motor 1810. First motor 1808 and second motor 1810 can move the ends of first inner arm 1814A and second inner arm 1814B, respectively, so that they slide laterally, thereby raising platform plate 1802. Battery pack 1806 is electrically coupled to first motor 1808 and second motor 1810 and powers the motors during operation. Elevating apparatus 1800 may be operated by electrically or otherwise communicatively coupling a pedal, button, switch, or other actuator to control first motor 1808 and second motor 1810 in order to raise and lower platform plate 1802. Also shown in FIG. 18 are wheels 1812, which are positioned so that the edges of wheels 1812 extend laterally beyond the ends of platform plate 1802. This allows a user to lift up the opposite end of platform plate 1802, thereby engaging wheels 1812 with the ground so that elevating apparatus 1800 may be conveniently pulled on wheels 1812. It should be appreciated that wheels may be incorporated into other embodiments in the same or similar manner as shown in FIG. 18 without departing from the principles disclosed herein. For example, a different set of wheels may also be utilized, wherein the wheels retract upon bearing a weight above a particular threshold, but are otherwise rotatable to allow for ease of moving apparatus 1800.

Figure 19:
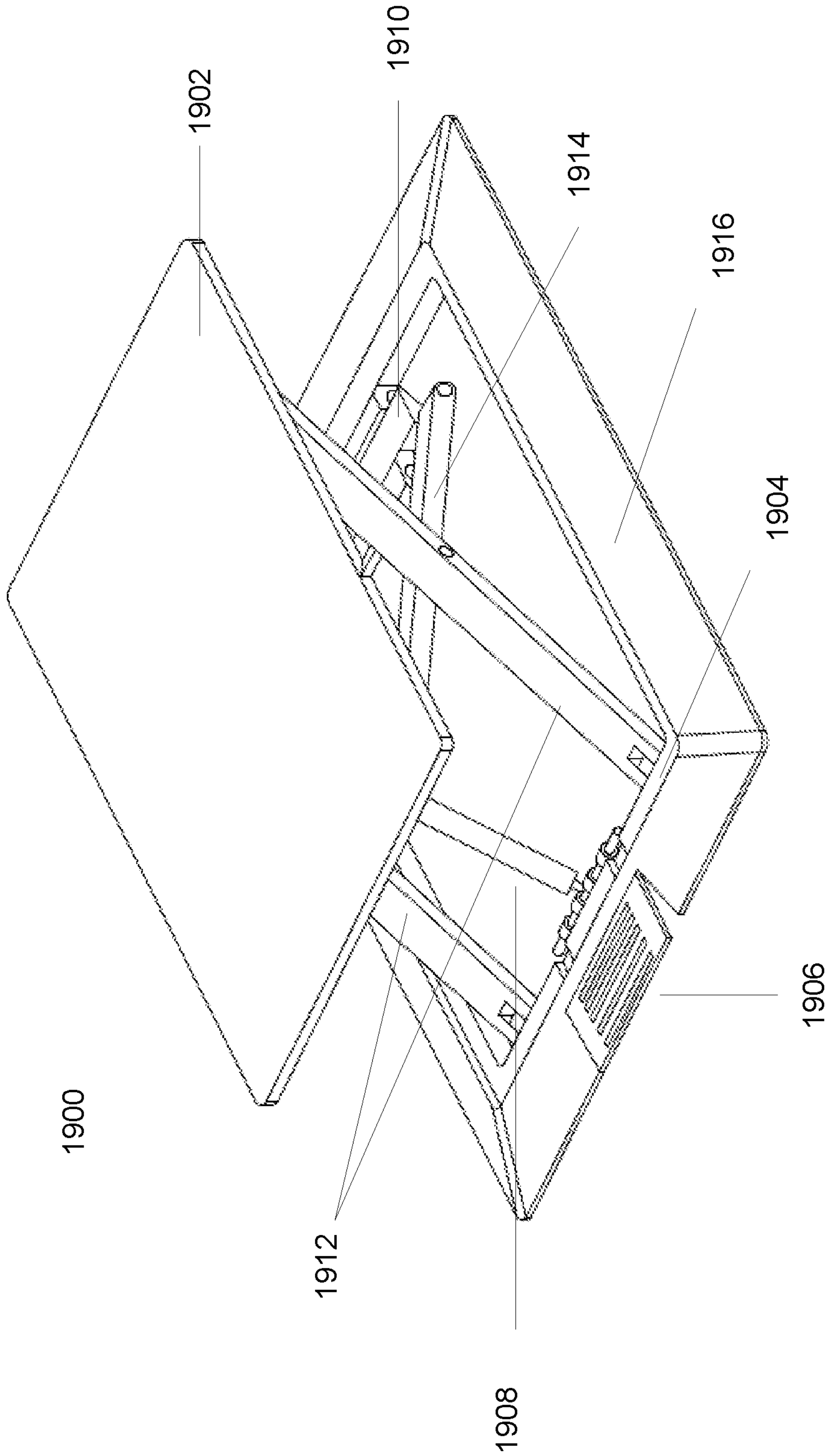
FIG. 19 illustrates an elevating apparatus with a mechanical lock.

FIG. 19 shows elevating apparatus 1900 in which platform plate 1902 is coupled to outer arms 1912 and inner arms 1914 (only one of which is visible). Outer arms are rotatably coupled to base plate 1904. Inner arms 1914 are coupled to mechanical lock 1910, which is configured to lock and hold inner arms 1914 from rotating, thereby securing platform plate 1902 in place. Pedal 1906 either mechanically or communicatively controls mechanical lock 1910 so that pressing down on pedal 1906 has the effect of toggling mechanical lock 1910 from a locked state to an unlocked state, and releasing pedal 1906 has the effect of toggling mechanical lock 1910 back to a locked state. Consistent with other embodiments, gas cylinder assembly 1908 applies an upward force on platform plate 1902, and base cushion 1916 is coupled to base plate 1904.

Figure 20A:
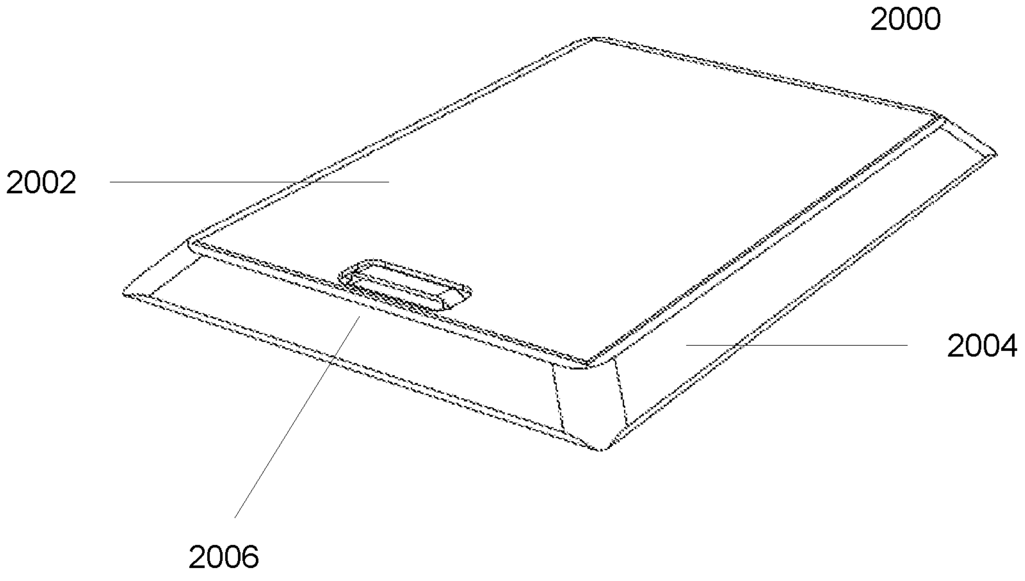
FIGS. 20A, 20B, 20C, and 20D illustrate a spring-activated elevating apparatus incorporating side foot-activated locking and release mechanism.
Figure 20B:
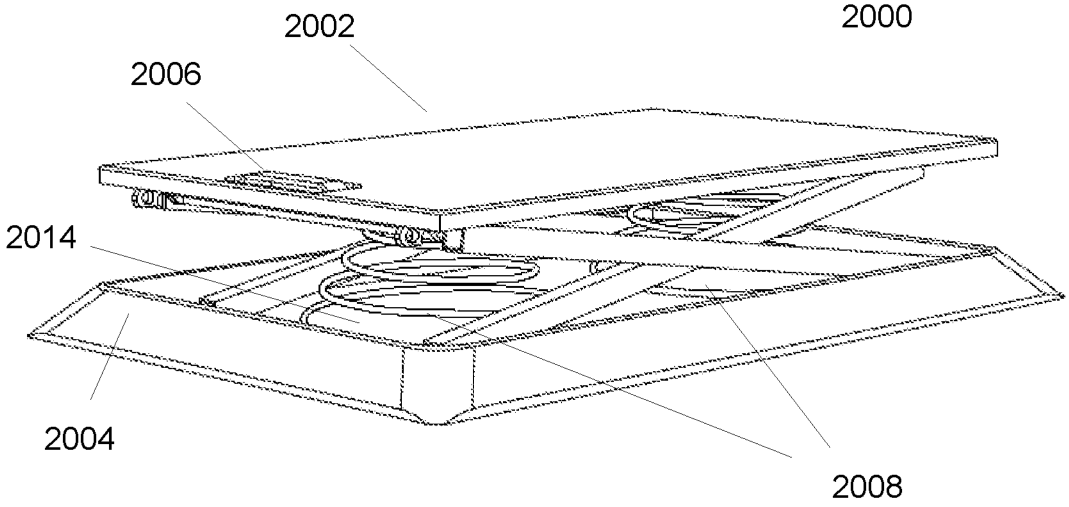
Figure 20C:
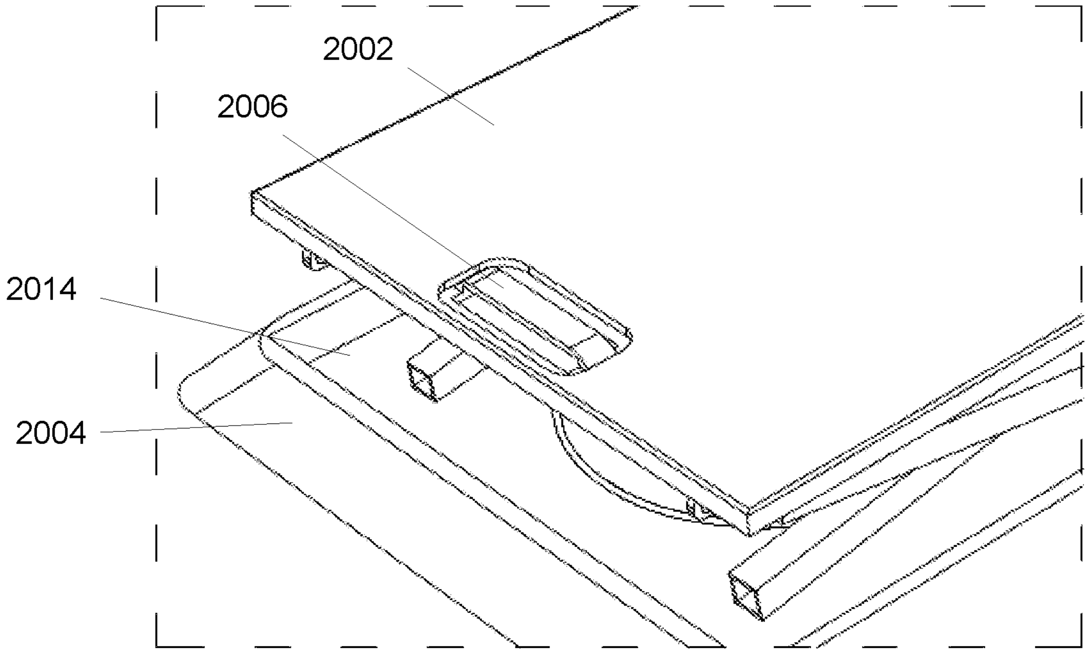
Figure 20D:
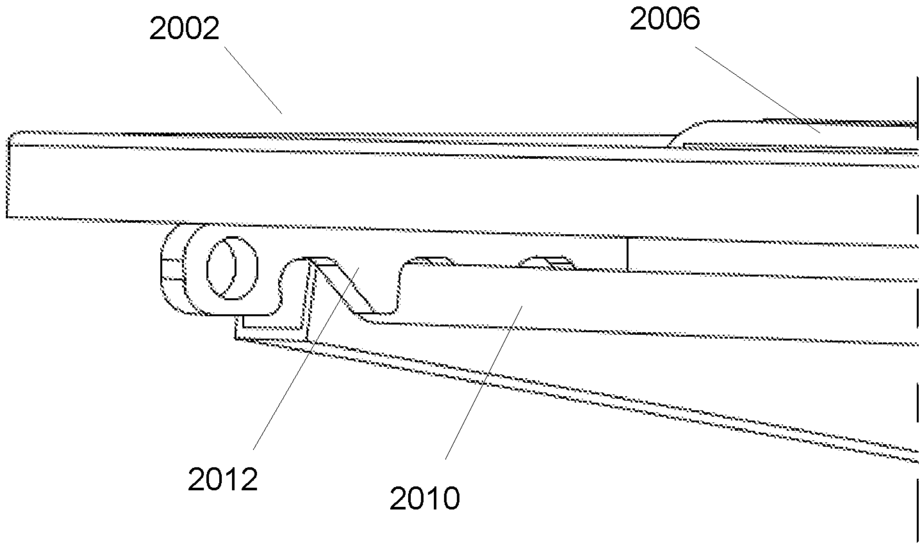

FIGS. 20A-20D demonstrate how a pull handle release may be employed in an elevating apparatus. FIG. 20A shows elevating apparatus 2000 in a compressed position in which platform plate 2002, base cushion 2004, and pull handle 2006 are visible. FIG. 20B shows elevating apparatus 2000 in a partially elevated position, which exposes base plate 2014 and springs 2008. FIG. 20C is a perspective view looking down on part of elevating apparatus 2000. FIG. 20D shows a close-up of the underside of platform plate 2002. Locking bar 2010 fits into a slot in slot frame 2012. To operate elevating apparatus 2000, a user pulls on pull handle 2006 which disengages locking bar 2010 from slot frame 2012 and allows it to move laterally with respect to slot frame 2012. Consequently, platform plate 2002 may be raised or lowered when pull handle 2006 is pulled. When the user releases pull handle 2006, locking bar 2010 engages with the corresponding slot in slot frame 2012, securing platform plate 2002 in place. By having multiple slots in slot frame 2012, platform plate 2002 may be secured in multiple positions, including a fully compressed position, a fully raised position, and optionally one or more intermediate positions.

In some embodiments, an elevating apparatus may have a pedal positioned on the platform plate that releases the platform plate to be raised or lowered. For example, an alternative embodiment of the elevating apparatus depicted in FIGS. 20A-20D may have pedal in place of pull handle 2006. Pressing the pedal down disengages a locking bar (such as locking bar 2010) from a slot frame (such as slot frame 2012) and allows it to move laterally with respect to the slot frame 2012, consequently allowing the platform plate to be raised or lowered.

Figure 21:
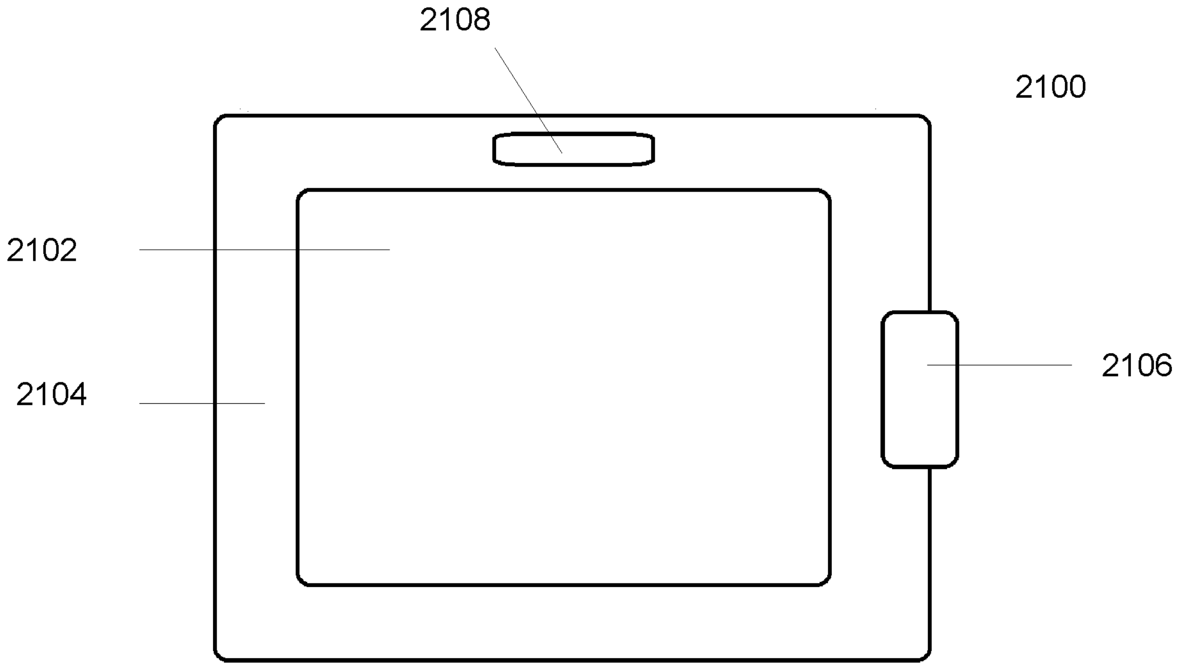
FIG. 21 illustrates an elevating apparatus incorporating a carrying handle.

FIG. 21 shows a top-down view of an elevating apparatus 2100 with a platform plate 2102, base cushion 2104, pedal 2106, and a carrying handle 2108. Carrying handle 2108 provides an easy way for a user to pick up and carry elevating apparatus 2100. It should be appreciated that one or more carrying handles may be incorporated into various embodiments of an elevating apparatus, and the position of the carrying handle may be varied as desired without departing from the principles disclosed herein.

Figure 22:
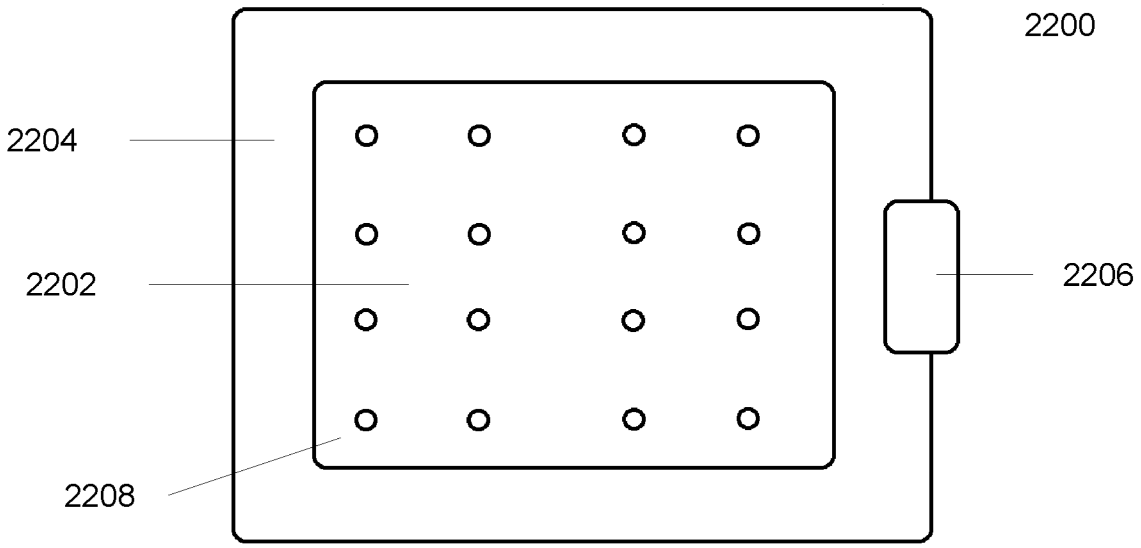
FIG. 22 illustrates an elevating apparatus with a perforated platform.

FIG. 22 shows a top-down view of an elevating apparatus 2200 with a platform plate 2202, base cushion 2204, pedal 2206, and perforations 2208. Perforations 2208 reduce the weight of platform plate 2202 and may increase the ease of raising and lowering platform plate 2202. Perforations 2208 may be used to receive and secure a mat or other object to the top of platform plate 2202 and to allow for the mat or other object to be easily detached for cleaning. For example, a soft polyurethane mat may be coupled to platform plate 2202 by inserting one or more extensions on the underside of the mat into one or more of perforations 2208. It should be appreciated that perforations may be incorporated into various embodiments of an elevating apparatus, and variations may be made to the number, size, shape, and arrangement of perforations without departing from the principles disclosed herein. In some embodiments, perforations may be included in the base cushion and/or pedal and/or other components of the elevating apparatus.

Figure 23:
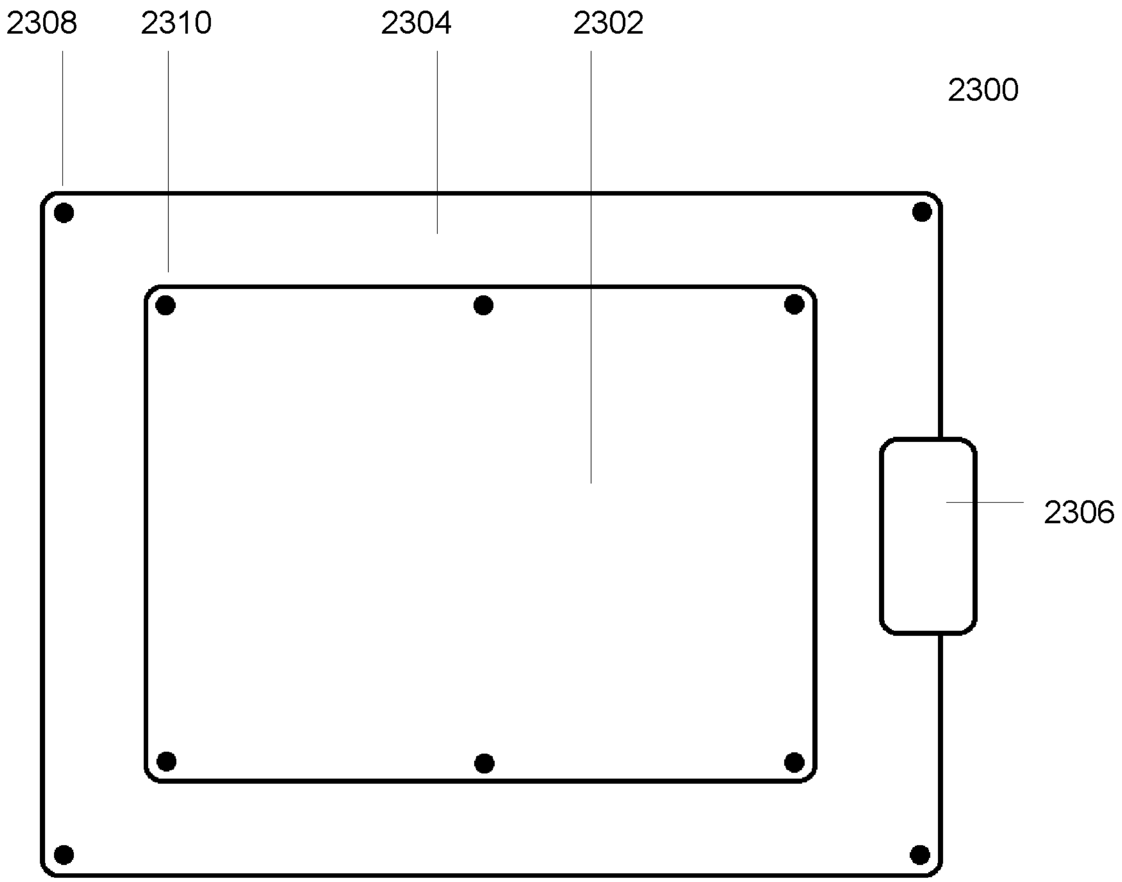
FIG. 23 illustrates an elevating apparatus incorporating lights.

FIG. 23 shows a top-down view of an elevating apparatus 2300 with a platform plate 2302, base cushion 2304, pedal 2306, base lights 2308, and platform lights 2310. In the configuration shown, four base lights 2308 are disposed in the base cushion at the corners, and six platform lights 2310 are disposed in platform plate 2302. Incorporating lights provides an aesthetically pleasing feature, allows a user to more easily see the edges of platform plate 2302 and base cushion 2304, and may assist a user in poorly lit or otherwise dark spaces. Base lights 2308 and platform lights 2310 may be LED lights or other suitable light source, and may be wired to one or more batteries or other appropriate power source such as a corded plug or one or more photovoltaic cells. It should be appreciated that lights may be incorporated into various embodiments of an elevating apparatus, and variations may be made to the number, size, shape, color, brightness, and arrangement of lights without departing from the principles disclosed herein. In some embodiments, lights may be included in the pedal or other components of the elevating apparatus.

Figure 24A:
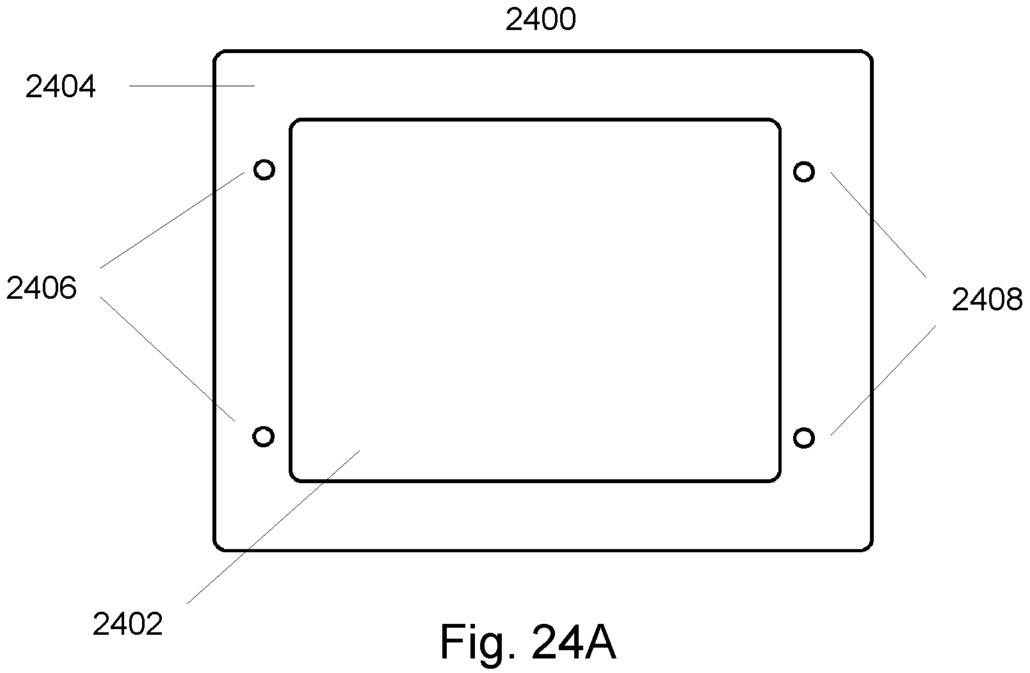
FIGS. 24A and 24B illustrate an elevating apparatus incorporating attachment holes.
Figure 24B:
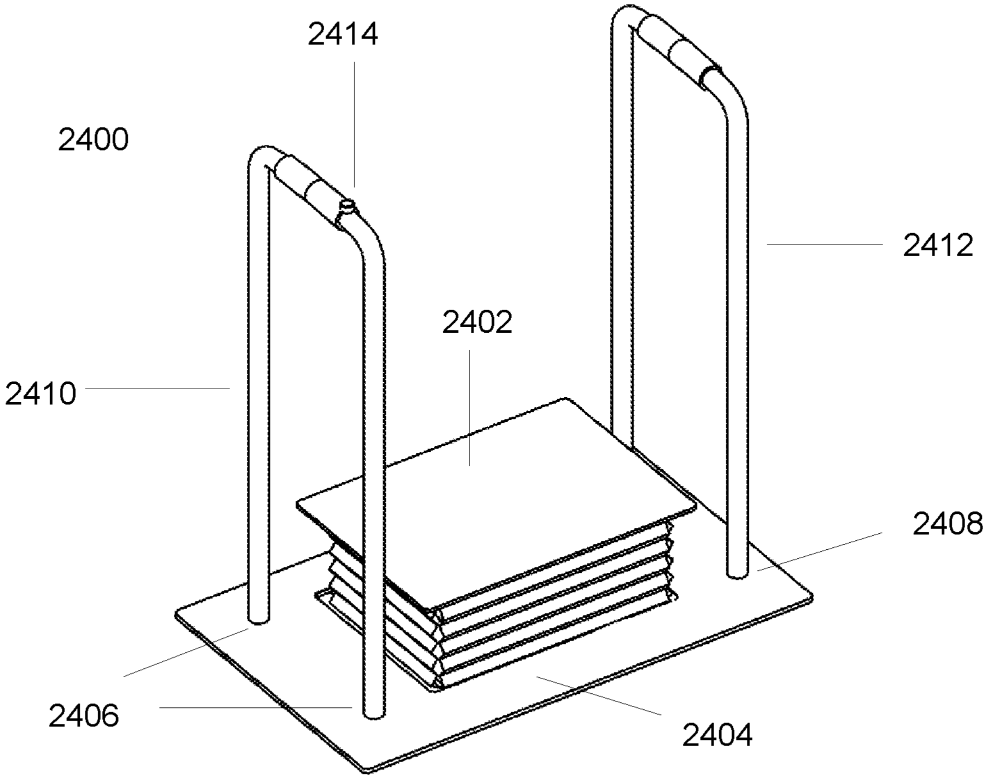

FIG. 24A shows an elevating apparatus 2400 comprising platform plate 2402, base cushion 2404, first anchor points 2406, and second anchor points 2408. In the embodiment shown, each anchor point is a cavity or receptacle with a recess configured to receive a handle so that it can "click" into place. In other embodiments, an anchor point may be formed by a smooth hole, a threaded hole, or any other suitable configuration that can couple with a handle. FIG. 24B shows elevating apparatus 2400 with first handle 2410 received in first anchor points 2406 and second handle 2412 received in second anchor points 2408. Button 2414, when pressed, activates a motor to elevate or depress platform plate 2402. Similar activation could be by remote control, motion, and/or voice activation. It should be appreciated that handles, seats, benches, guardrails, or other similar attachments may be incorporated into various embodiments of an elevating apparatus, and variations may be made to the number, size, shape, and arrangement of such handles or other attachments without departing from the principles disclosed herein. In some embodiments, anchor points and/or handles and/or other attachments may be included in the platform plate without departing from the principles disclosed herein.

Figure 25A:
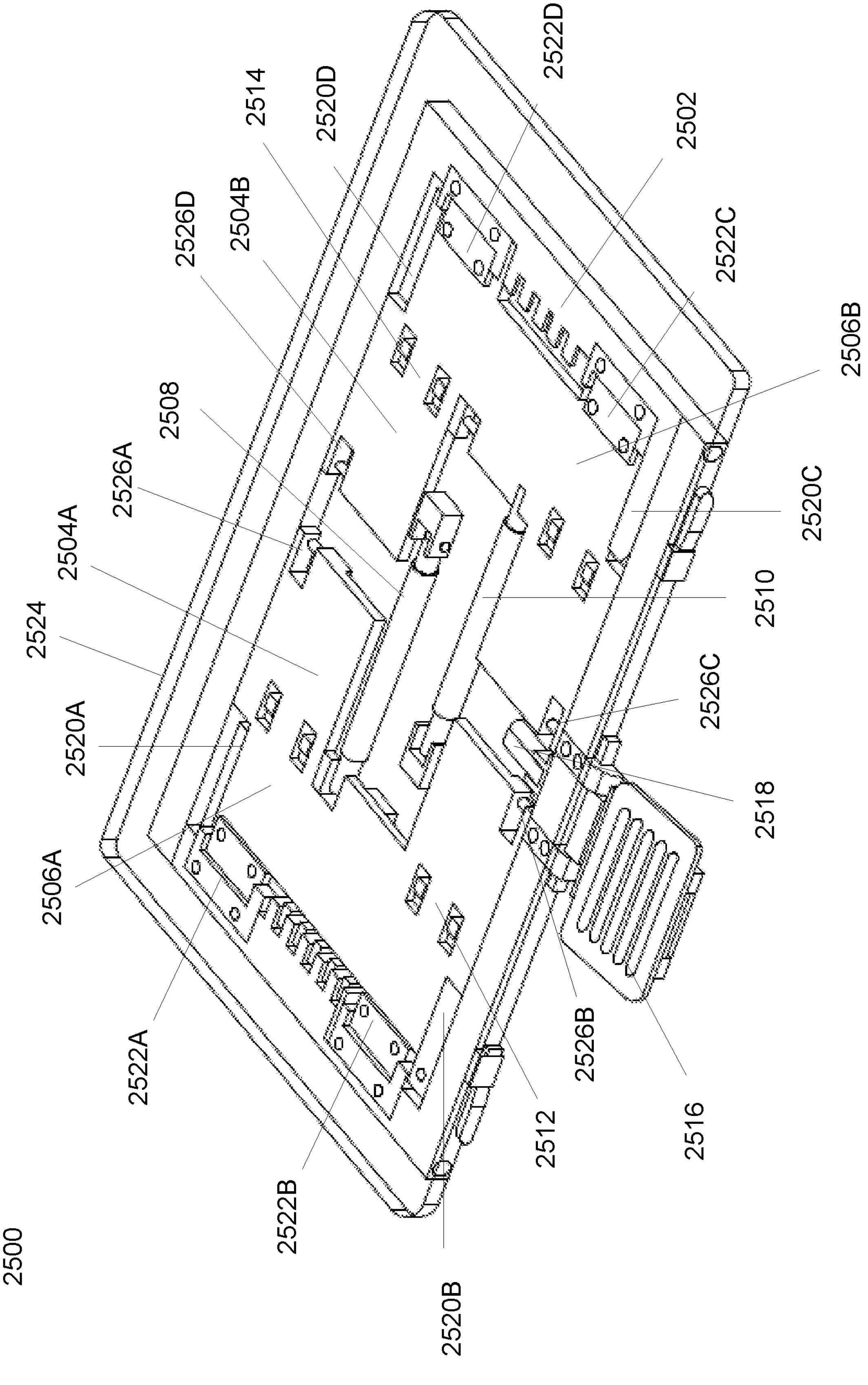
FIGS. 25A, 25B, and 25C illustrate an elevating apparatus comprising two gas cylinder assemblies, two end walls, two support walls, four pedal levers, and four latch bars.
Figure 25B:
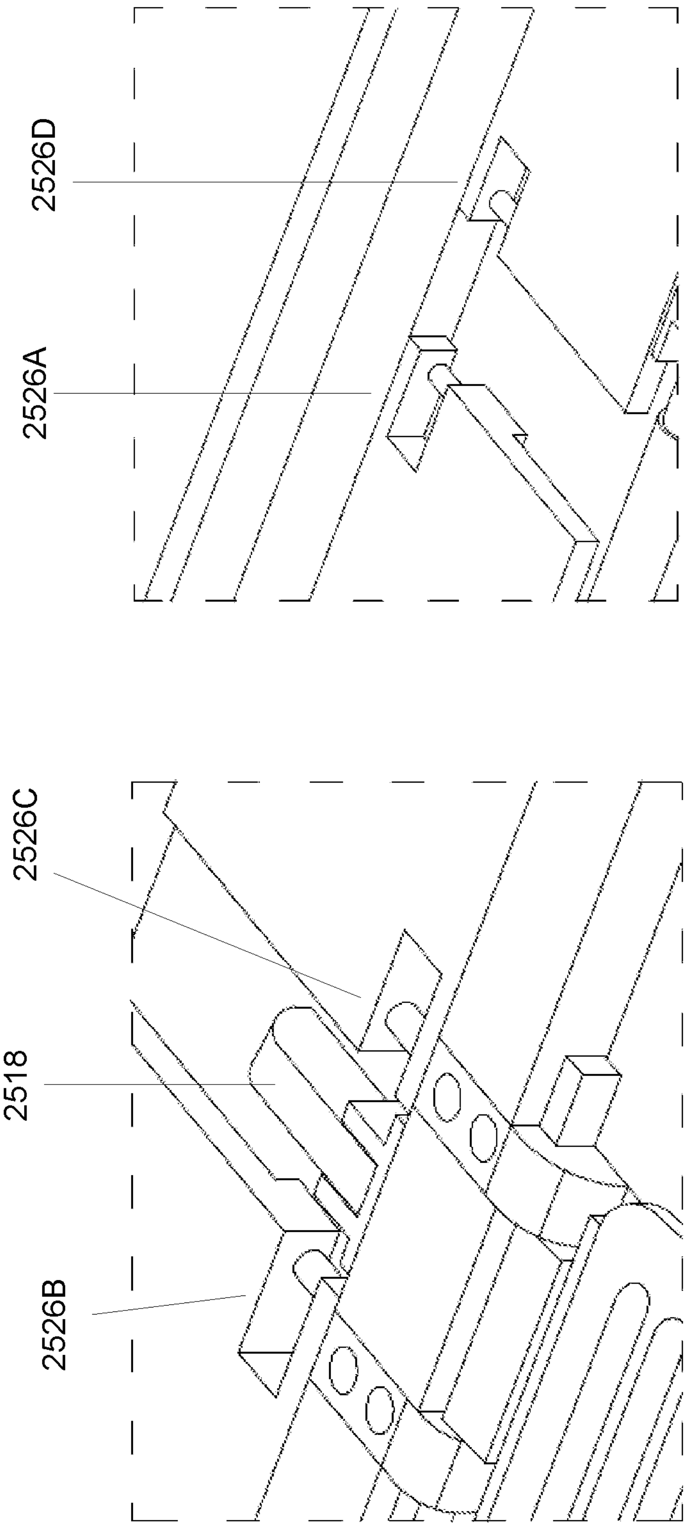

FIG. 25A shows an elevating apparatus 2500 in a compressed position with a platform plate 2524 removed to show the internal components. First end wall 2504A is coupled to first support wall 2506A at first wall hinge 2512. First end wall 2504A comprises first latch bar 2526A and second latch bar 2526B. Second end wall 2504B is coupled to second support wall 2506B at second wall hinge 2514. Second end wall 2504B comprises third latch bar 2526C and fourth latch bar 2526D. First gas cylinder apparatus 2508 is coupled to first wall hinge 2512 and platform plate 2524. Second gas cylinder apparatus 2510 is coupled to second wall hinge 2514 and platform plate 2524. Pedal 2516 is coupled to base frame 2502 and is configured to move center pedal lever 2518, first corner pedal lever 2520A, second corner pedal lever 2520B, third corner pedal lever 2520C, and fourth corner pedal lever 2520D. When assembled, platform plate 2524 is coupled to first support wall 2506A at first plate mounting point 2522A and second plate mounting point 2522B, and it is coupled to second support wall 2506B at third plate mounting point 2522C and fourth plate mounting point 2522D. FIG. 25B shows close up views of first latch bar 2526A, second latch bar 2526B, third latch bar 2526C, and fourth latch bar 2526D.

Figure 25C:
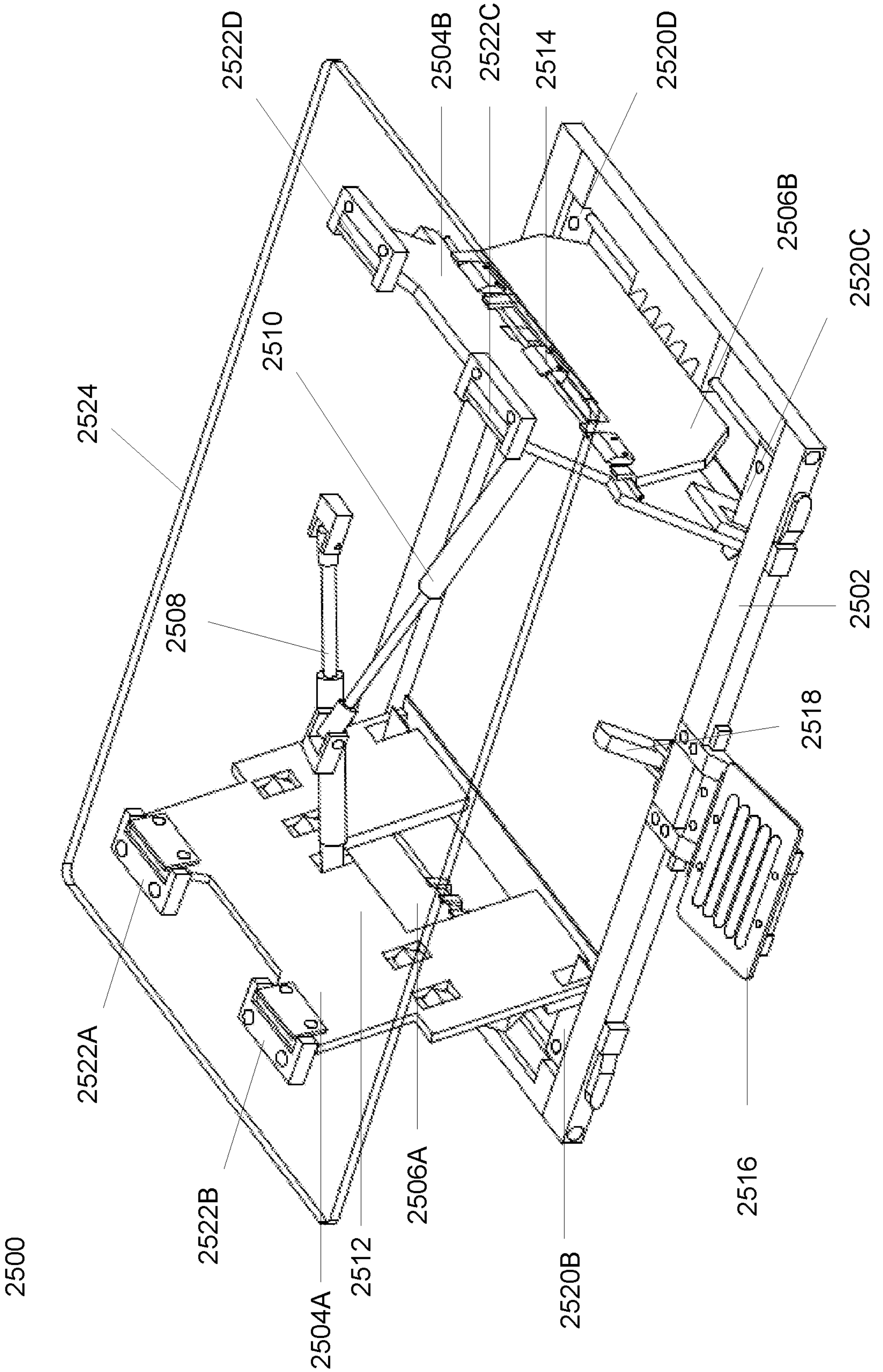

FIG. 25C shows elevating apparatus 2500 in a raised position, with platform plate 2524 not shown to better illustrate the internal components. In the compressed position, first gas cylinder assembly 2508 and second gas cylinder assembly 2510 are contracted and exert an outward pressure but remain motionless. To raise platform plate 2524 from the compressed position, a user depresses pedal 2516, which has the effect of raising center pedal lever 2518, first corner pedal lever 2526A, second corner pedal lever 2526B, third corner pedal lever 2526C, and fourth corner pedal lever 2526D. Raising center pedal lever 2518 presses upward on platform plate 2524 and moves it upward a small distance. At that point, first gas cylinder assembly 2508 and second gas cylinder assembly 2510 are sufficiently angled so that their outward pressure is able to move first wall hinge 2512 and second wall hinge 2514 outward, respectively. As first gas cylinder assembly 2508 and second gas cylinder assembly 2510 extend, the bottom edges of first end wall 2504A and second end wall 2504B move outward towards the ends of base frame 2502 until elevating apparatus 2500 is in the fully raised position. At that point, first latch bar 2526A catches on first corner pedal lever 2520A, which secures first latch bar 2526A in place. Likewise, second latch bar 2526B catches on second corner pedal lever 2520B, third latch bar 2526C catches on third corner pedal lever 2520C, and fourth latch bar 2526D catches on fourth corner pedal lever 2520D, all of which are then secured in place. In the raised position, platform plate 2524 may support a weighted load.

Figure 25D:
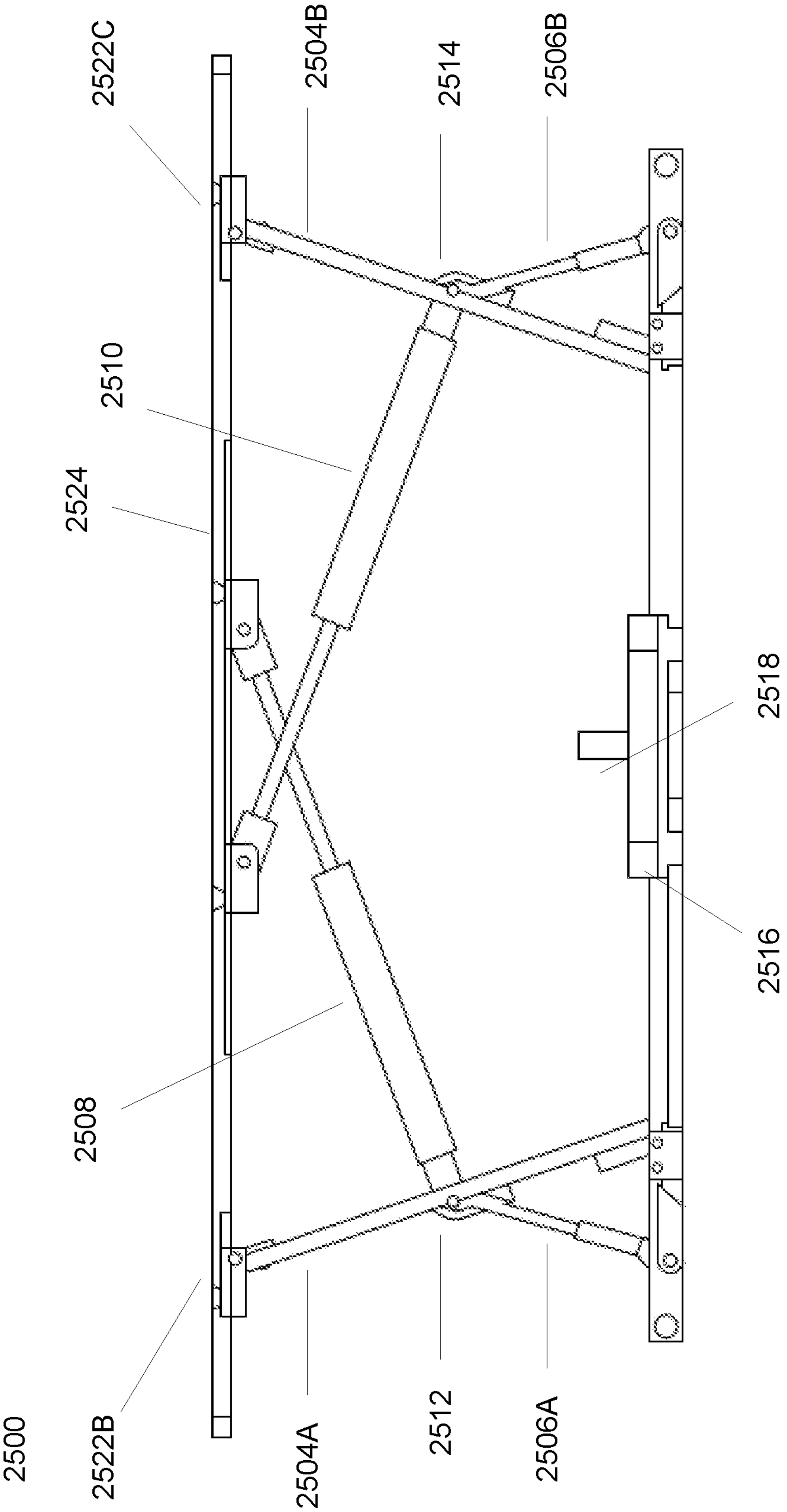

FIG. 25D shows a side view of elevating apparatus 2500 in the raised position. In order to lower platform plate 2524 and return elevating apparatus 2500 to the compressed position, a user depresses pedal 2516. That has the effect of raising first corner pedal lever 2520A, second corner pedal lever 2520B, third corner pedal lever 2520C, and fourth corner pedal lever 2520D. Raising the pedal levers releases first latch bar 2526A and second latch bar 2526B, which allows first end wall 2504A to rotate inward and downward. Raising the pedal levers also releases third latch bar 2526C and fourth latch bar 2526D, which allows second end wall 2504B to rotate inward and downward. Platform plate 2502 may then be lowered, which may require a user to press down on platform plate 2502. As platform plate 2502 is lowered, first support wall 2506A and second support wall 2506B rotate downward and first gas cylinder assembly 2508 and second gas cylinder assembly 2510 are compressed. Once elevating apparatus 2500 is fully compressed, it is secured in place. A user may then raise it again by pressing down on pedal 2516.

Figure 26:
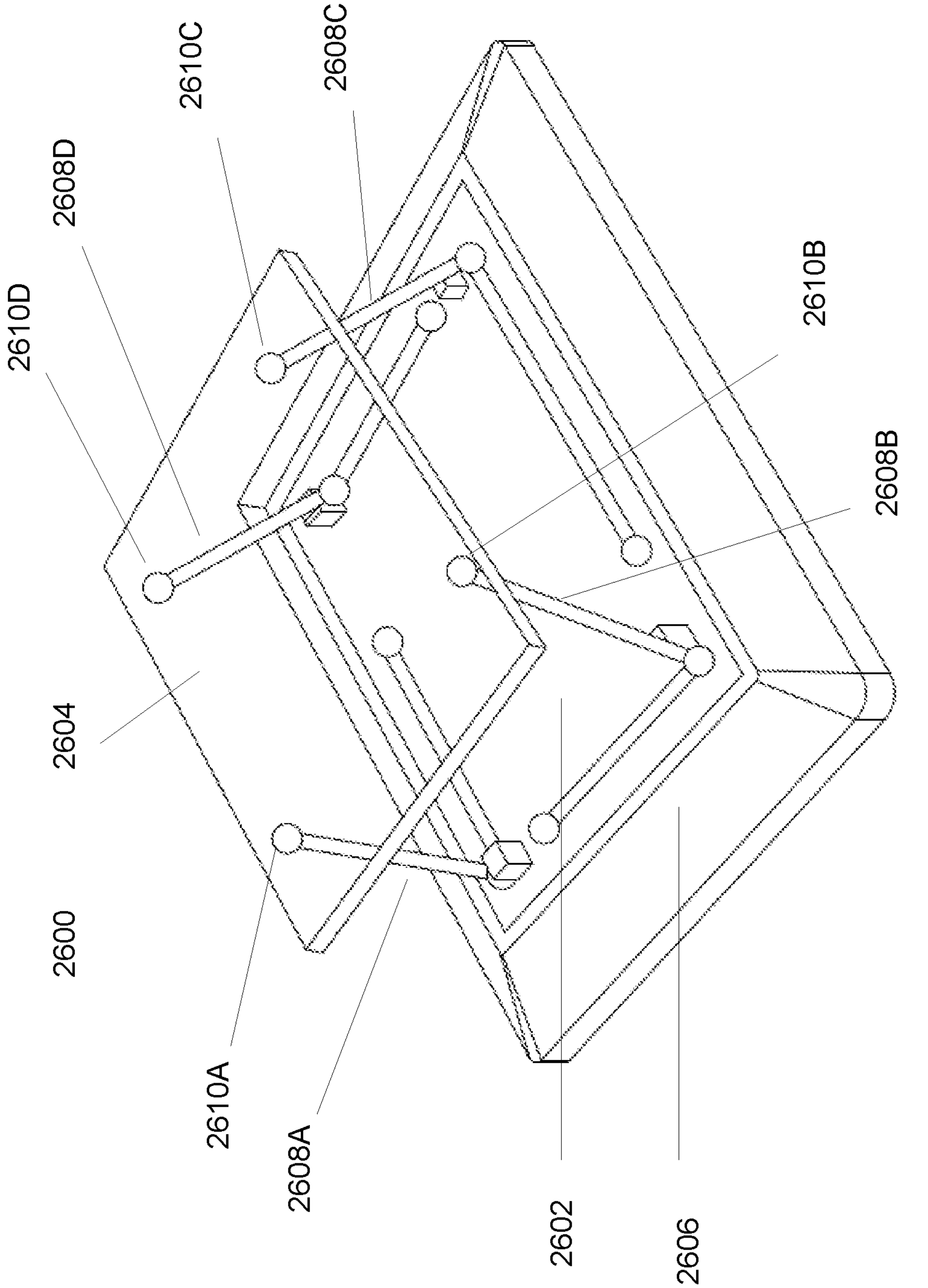
FIG. 26 illustrates an elevating apparatus with four spacer bars, each with a ball and socket joint on one end and a hinged connection on the opposite end.

FIG. 26 depicts elevating apparatus 2600, which comprises platform base 2602, platform plate 2604, and an optional base cushion 2606. Platform plate 2602 is coupled to first spacer bar 2608A, second spacer bar 2608B, third spacer bar 2608C, and fourth spacer bar 2608D via first joint 2610A, second joint 2610B, third joint 2610C, and fourth joint 2610D, respectively. Each of first joint 2610A, second joint 2610B, third joint 2610C, and fourth joint 2610D comprises a ball and socket so that platform plate 2604 may rotate with respect to platform base 2602 as it is raised or lowered. At the opposite end of each of first spacer bar 2608A, second spacer bar 2608B, third spacer bar 2608C, and fourth spacer bar 2608D is a hinge joint. A track is shown in platform base 2604 for each of first spacer bar 2608A, second spacer bar 2608B, third spacer bar 2608C, and fourth spacer bar 2608D to fit into when elevating apparatus 2600 is in the compressed position so that platform plate 2604 may lay flush with the surrounding edges of platform base 2602. When an actuator (such as a pedal), not shown, is pressed to release platform plate 2604 from the compressed position, a force generator (which may be spring biased hinges) raises platform plate 2604. First spacer bar 2608A, second spacer bar 2608B, third spacer bar 2608C, and fourth spacer bar 2608D rotate upward about their hinged connections to platform base 2602, and platform plate 2604 rotates about first joint 2610A, second joint 2610B, third joint 2610C, and fourth joint 2610D with respect to platform base 2602. Lowering platform plate 2604 to put elevating apparatus 2600 in the compressed position results in the same respective motions in the opposite directions.

Figure 27:
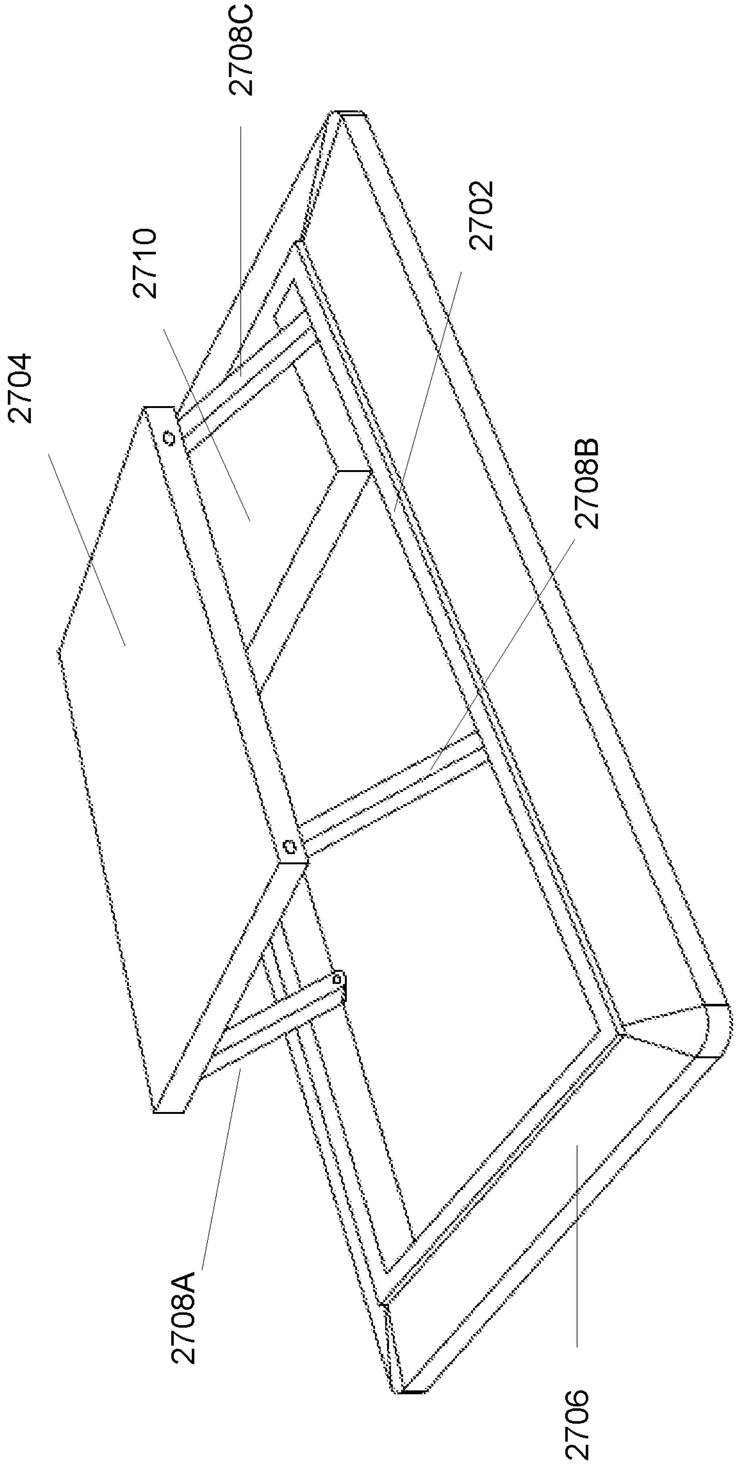
FIG. 27 illustrates an elevating apparatus with four arms each with hinged connections.

FIG. 27 depicts elevating apparatus 2700, which comprises base frame 2702, platform plate 2704, and an optional base cushion 2706. Platform plate 2704 is supported by first arm 2708A, second arm 2708B, third arm 2708C, and a fourth arm (not shown). Each of the arms has a hinged coupling to platform plate 2704 and a hinged coupling to base frame 2702. Due to the hinge joints, platform plate 2704 moves laterally as it is raised and lowered. Base frame 2702 comprises a protrusion 2710 so that when elevating apparatus 2700 is in the compressed position, platform plate 2702 is flush with the surrounding edges of base frame 2702. When elevating apparatus 2700 is in the raised position, platform plate 2702 is at least partially positioned above protrusion 2710.

Figure 28:
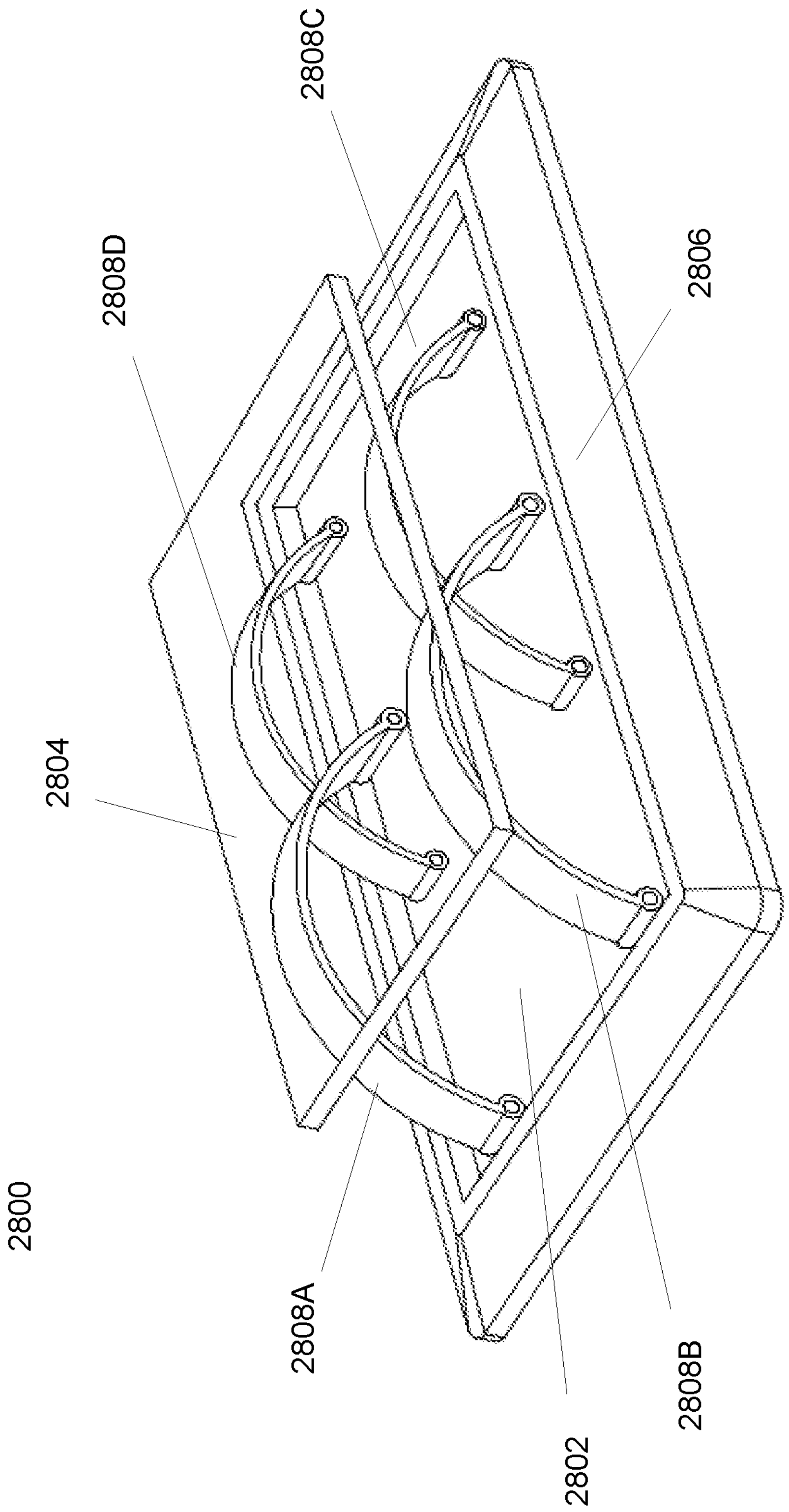
FIG. 28 illustrates an elevating apparatus with four leaf springs.

FIG. 28 depicts elevating apparatus 2800, which comprises base frame 2802, platform plate 2804 (shown as transparent), and an optional base cushion 2806. Platform plate 2804 is supported by first leaf spring 2808A, second arm 2808B, third arm 2808C, and fourth leaf spring 2808D, each of which is coupled to platform plate 2804 at its center. When an actuator (such as a pedal), not shown, is pressed to release platform plate 2804, the ends of each of first leaf spring 2808A, second arm 2808B, third arm 2808C, and fourth leaf spring 2808D are drawn together, thereby raising the center of the springs and platform plate 2804.

Each of the foregoing embodiments contains one or more features that may be incorporated into other embodiments without departing from the principles disclosed herein. For example, the use of a pull handle (as shown in FIGS. 20A-20D) may be used in place of, or in addition to, the pedal in the elevating apparatus shown in FIGS. 12A-12B. As another example, the first and second curtains shown in FIGS. 13B-13C, or other suitable protective covering, may be incorporated into the elevating apparatus shown in FIGS. 15A-15B or other embodiments.

An elevating apparatus in accordance with the principles disclosed herein may comprise parts made of plastic, wood, metal, composite, other suitable materials, or a combination of one or more of the foregoing. Cushioned surfaces may be used with many embodiments of an elevating apparatus as described herein. In some embodiments, an anti-fatigue mat substance may be applied to the platform plate and may be applied around the base plate so that when the elevating apparatus is in a compressed position, it resembles a traditional anti-fatigue mat. Rubber, foam, vinyl, plastic, composite, gel, carpet, and/or other suitable substances may be used to form a cushioned surface on the platform plate and/or base. In some applications, a hard and/or textured material may be used instead of cushioning material on the platform plate and/or outer base surfaces.

While some embodiments disclosed herein include a cushion coupled to a base plate or base frame, it should be understood that alternative embodiments may comprise a base plate or base frame that omits a cushion. Some embodiments may have a base plate or base frame that extends outward with one or more beveled sides to help prevent tripping. In such embodiments, the base plate or base frame may comprise a hard plastic, wood, metal, composite, one or more other suitable materials, or a combination of one or more of the foregoing.

Some embodiments disclosed herein, such as the elevating apparatuses shown in FIG. 1 and FIG. 15A, incorporate a flat base plate that supports the internal components of the elevating apparatus. It should be understood that some embodiments, such as elevating apparatuses shown in FIG. 14B and FIG. 18, can omit a flat base plate and instead use a frame that is open on some or most of the bottom. Such configurations can help reduce the cost and weight of the elevating apparatus. In further embodiments, modifications may be incorporated to enable the attachment of an elevating apparatus to an existing floor (or to create an elevating apparatus with an existing floor) without the need of a base plate or open frame.

An elevating apparatus may be built into a floor (or other surface) or inserted into a recess in a floor (or other surface) so that when it is in the compressed position, the top surface of the platform plate is flush with the surrounding floor (or other surface). In one application, an elevating apparatus is built into a kitchen floor with a tile surface, and the top of the platform plate is made to match the surrounding tile. A pedal may be included that is also flush with the floor, and when pressed, enables the platform plate to raise up and secure in the raised position or be lowered to the compressed position or an intermediate position as described herein. Alternate means for controlling the platform plate may be used as described herein.

An elevating apparatus may be built into a drawer or similar apparatus that can slide into or out of a wall, cabinet, drawer, or similar environment. In one example, an elevating apparatus is built into a drawer underneath a countertop. In this example, the elevating apparatus is in a compressed position when stowed away. A user pulls the elevating apparatus out from underneath the countertop so that the platform plate is exposed. The bottom of the elevating apparatus is preferably supported by a structurally supported drawer base or the floor in order to support a load. The user may activate the elevating apparatus to raise the platform plate, then stand on the platform plate in the raised position to, for example, reach a high cabinet or cupboard. The user may then lower the platform plate and return the elevating apparatus to the compressed position, then slide the elevating apparatus back underneath the countertop.

For portable embodiments, a flat surface is preferred to support the base. However, it should be understood that modifications in the form of leveling apparatuses such as adjustable feet can be utilized so that an elevating apparatus can be used on, for example, an uneven surface.

In some embodiments of an elevating apparatus, the platform plate may be pushed down when in the compressed position, thereby releasing the platform plate to be raised up by a gas cylinder assembly or other source of force. Once in the fully raised position, the platform plate locks itself in place. In order to lower the platform plate, the user may pull upward on the plate to release it from the lock, then press down to lower the plate back into the compressed position.

Various embodiments of an elevating apparatus may employ one or more force generators to raise and/or lower the platform plate. Some embodiments may employ one or more springs, one or more gas cylinder assemblies, one or more motors, and/or other appropriate means for generating a force to raise and/or lower a platform plate. Biased hinges are disclosed with respect to elevating apparatus 1600 and elevating apparatus 1700. Biased hinges may be used with other embodiments, including for example, elevating apparatus 100. The bias may be provided by a spring positioned inside or proximate to the hinge, or by other appropriate biasing means. The use of biased hinges may assist in raising or lowering a platform plate, and/or raising or lowering a pedal or pull handle, and/or other functions.

Embodiments of an elevating apparatus that employ one or more motors or other electromechanical devices may be capable of securing the platform plate at any intermediate position, rather than a set of predetermined intermediate intervals. For example, an embodiment in which a motor turns a screw to raise the platform plate (or powers a hydraulic system to raise the platform) can be turned on and off at the user's discretion, thereby stopping and securing the platform plate the desired height.

For embodiments that incorporate electrical, electronic, or electromechanical components, one or more sources of electricity may be used. Compatible examples include power from an outlet, battery, and photovoltaic cell. In some embodiments, one or more batteries are used to supply power to electrical, electronic, and/or electromechanical components, and one or more photovoltaic cells are used to recharge the battery(s).

The embodiments disclosed herein incorporate a pedal, pull handle, button, switch, or other actuator. Other means of releasing or securing a platform plate, such as a lever, may be used in addition to or instead of a pedal without departing from the principles disclosed herein. In some embodiments, a button, pressure sensitive pad, or other similar device may trigger an electrical signal or radio signal that communicates an instruction to a receiver, which then activates an electromechanical actuator to raise or lower the platform plate or accomplish other functionality. For example, an elevating apparatus may comprise a pressure sensitive pad that is communicatively coupled to a solenoid that actuates the platform, raising or lowering the platform plate. Further, such means of releasing or securing a platform plate may incorporate a secondary locking mechanism to protect from unintended use. For example, a removable cover may be deployed on top of a button, or a safety may be deployed with a pedal that prevents the pedal from moving until the safety is removed.

Some embodiments disclosed herein incorporate a slot frame or similar structure that enables a platform plate to be secured in one or more intermediate positions in between the fully compressed and the fully raised positions. Such features may be incorporated into other embodiments where suitable, in order to enable a platform plate to be secured in intermediate positions.

Some embodiments of an elevating apparatus as disclosed herein may be configured so that an actuator (such as pedal, handle, button, switch, or other actuator) raises or lowers the platform plate by a predetermined intermediate amount. For example, an elevating apparatus may be configured so that when the elevating apparatus is fully compressed and a user presses the pedal, the platform plate is raised by two inches (5 cm) and then locks in place. When the user presses on the pedal again, the platform plate is raised by another two inches (5 cm). This process can be repeated until the platform plate reaches its maximum height. The elevating apparatus can be configured so that the platform plate lowers in intermediate intervals, or it can be configured so that the platform plate lowers completely into the compressed position when the pedal is pressed once.

In some embodiments, a force generator (such as a gas cylinder assembly, spring, or biased hinges) is configured to exert a contracting force that pulls the platform plate towards the base plate. In such embodiments, a user must release the platform plate (via a pedal or other means) and pull the platform plate upward until it is secured in place. In such configurations, a handle or grip may be helpful for the user to grasp the platform plate when pulling upward. When the user is ready to compress the elevating apparatus, the user can release the platform plate (via the pedal or other means), and the force generator retracts the platform plate until it is secured in the compressed position. Such a configuration may be useful for applications where it is preferable to have an easy and relatively hands-off retraction of the elevating apparatus.

In some embodiments, a dampener may be used to prevent the platform plate from abruptly hitting the base plate when the elevating apparatus is being returned to the compressed position. The dampener may be built in to the gas shock device, comprising a single unit.

In some embodiments, one or more vibration sources may be incorporated to provide a massaging effect for a user or to provide tactile feedback to a user. The vibration source may be a weighted motor or other appropriate device mounted on the underside of the platform plate, on the base plate, on an arm, on or underneath a pedal or pull handle, or in another appropriate location, and may be electrically coupled to a power source stored within the elevating apparatus or external to the elevating apparatus.

In some embodiments, one or more heating elements may be incorporated to provide a heated platform plate and/or base frame for a user.

In some embodiments, an audio interface may be incorporated into the elevating apparatus and configured so that a user may provide voice commands that are recognized by the audio interface, which then triggers an electromechanical actuator to raise or lower the platform plate or accomplish other functionality such as to engage lights or vibration. In some embodiments, a radio communication may be incorporated into the elevating apparatus and configured so that a user may provide commands via radio signal (such as remote control, Bluetooth or WiFi communication) to raise or lower the platform plate or accomplish other functionality.

The foregoing description is not intended to be limiting or represent an exhaustive enumeration of the principles disclosed herein. It will be apparent to those of skill in the art that numerous changes may be made in such details without departing from the spirit of the principles disclosed herein.

What is claimed is:

1. An elevating apparatus, comprising:

a base plate;

a platform plate including a first sliding track and a second sliding track, the first sliding track and the second sliding track disposed adjacent respective opposing sides of the base plate;

a first arm rotatably coupled to the base plate and slidably coupled to the platform plate;

a second arm rotatably coupled to the base plate and slidably coupled to the platform plate;

a third arm rotatably coupled to the platform plate;

a fourth arm rotatably coupled to the platform plate;

a locking bar coupled to the third arm and the fourth arm;

a release mechanism configured to raise the locking bar when the release mechanism is engaged; and a pressure source having a first end and a second end, the first end coupled to a central portion of the base plate longitudinally between a first end and a second end of the base plate and the second end attached to the platform plate, the pressure source configured to apply a separating force between the base plate and the platform plate;

a first alignment track, the first alignment track aligned with the third arm when the third arm is in a lowered position;

a second alignment track, the second alignment track aligned with the fourth arm when the fourth arm is in a lowered position;

a first notch in the first alignment track;

a second notch in the first alignment track;

a first notch in the second alignment track;

a second notch in the second alignment track;

wherein:

the third arm and the fourth arm are each coupled to a first cross bar, the first cross bar configured to rotatably couple the third arm and the fourth arm to the platform plate, the first arm and the second arm are each coupled to a second cross bar, the second cross bar configured to slide in the first sliding track and the second sliding track, the release mechanism includes a pedal, the pedal includes a pedal plate, the pedal plate configured to engage with the locking bar when the pedal is pressed, the first alignment track comprises a first pair of rails, the first pair of rails configured to receive a portion of the third arm when the elevating apparatus is in the lowered position, the second alignment track comprises a second pair of rails, the second pair of rails configured to receive a portion of the fourth arm when the elevating apparatus is in the lowered position, the release mechanism configured such that downward actuation of the pedal causes the locking bar to move vertically to disengage from the first notch in the first alignment track and the first notch in the second alignment track, thereby permitting the pressure source to expand and elevate the platform plate relative to the base plate.

2. The elevating apparatus of claim 1, wherein the elevating apparatus is configured so that when the platform plate is lowered, engaging the release mechanism releases the platform plate to rise;

wherein the elevating apparatus is configured so that when the platform plate is raised and not supporting external weight, engaging the release mechanism enables the platform plate to be lowered; and wherein the elevating apparatus is configured so that when the platform plate is raised and supporting external weight, the locking bar is secured in the first notch in the first alignment track and the first notch in the second alignment track, preventing the locking bar from being raised.

3. The elevating apparatus of claim 1, comprising a cushioning material coupled to the base plate.

4. The elevating apparatus of claim 1, comprising a cushioning material coupled to the platform plate.

5. The elevating apparatus of claim 1, comprising:

a first cushioning material coupled to the base plate; and a second cushioning material coupled to the platform plate.

6. The elevating apparatus of claim 1, wherein the pressure source is a gas cylinder assembly.

7. The elevating apparatus of claim 1, comprising a carrying handle.

8. The elevating apparatus of claim 1, comprising one or more perforations in the platform plate.

9. The elevating apparatus of claim 1, comprising:

an electrical energy source; and one or more lights coupled to the electrical energy source.

10. The elevating apparatus of claim 1, wherein the release mechanism comprises a pedal.

11. The elevating apparatus of claim 1, further comprising a pedal spring disposed on the base plate adjacent the pedal, the pedal spring configured to bias the pedal toward a raised position.

12. The elevating apparatus of claim 1, wherein the first alignment track and the second alignment track each have a U-shaped cross-section.

13. The elevating apparatus of claim 1, wherein each of the first sliding track and the second sliding track include a first portion and a second portion disposed opposite one another.

14. The elevating apparatus of claim 13, wherein the first portion and the second portion of each sliding track each include an aperture configured to receive the second cross bar.

15. The elevating apparatus of claim 14, wherein the aperture is stadium shaped.

16. The elevating apparatus of claim 15, wherein the first portion and the second portion of each sliding track are spaced apart to define a channel configured to receive a portion of one of the first arm and the second arm.

17. An elevating apparatus, comprising:

a base plate;

a platform plate including a first sliding track and a second sliding track, the first sliding track and the second sliding track disposed adjacent respective opposing sides of the base plate;

a first arm rotatably coupled to the base plate and slidably coupled to the platform plate;

a second arm rotatably coupled to the base plate and slidably coupled to the platform plate;

a third arm rotatably coupled to the platform plate;

a fourth arm rotatably coupled to the platform plate;

a locking bar coupled to the third arm and the fourth arm;

a pedal configured to raise the locking bar when the pedal is depressed; and a gas cylinder having a first end and a second end, the first end coupled to a central portion of the base plate longitudinally between a first end and a second end of the base plate and the second end attached to the platform plate, the gas cylinder configured to apply a separating force between the base plate and the platform plate;

a first alignment track, the first alignment track aligned with the third arm when the third arm is in a lowered position;

a second alignment track, the second alignment track aligned with the fourth arm when the fourth arm is in a lowered position;

a first notch in the first alignment track;

a second notch in the first alignment track;

a first notch in the second alignment track;

a second notch in the second alignment track;

wherein:

the third arm and the fourth arm are each coupled to a first cross bar, the first cross bar configured to rotatably couple the third arm and the fourth arm to the platform plate, the first arm and the second arm are each coupled to a second cross bar, the second cross bar configured to slide in the first sliding track and the second sliding track, the pedal includes a pedal plate, the pedal plate configured to engage with the locking bar when the pedal is pressed, the first alignment track comprises a first pair of rails, the first pair of rails configured to receive a portion of the third arm when the elevating apparatus is in the lowered position, the second alignment track comprises a second pair of rails, the second pair of rails configured to receive a portion of the fourth arm when the elevating apparatus is in the lowered position, the pedal configured such that depressing the pedal causes the pedal plate to raise causing the locking bar to move vertically to disengage from the first notch in the first alignment track and the first notch in the second alignment track, thereby permitting the gas cylinder to expand and elevate the platform plate relative to the base plate.

18. The elevating apparatus of claim 17, wherein the elevating apparatus is configured so that when the platform plate is lowered, depressing the pedal releases the platform plate to rise;

wherein the elevating apparatus is configured so that when the platform plate is raised and not supporting external weight, depressing the pedal enables the platform plate to be lowered; and wherein the elevating apparatus is configured so that when the platform plate is raised and supporting external weight, the locking bar is secured in the first notch in the first alignment track and the first notch in the second alignment track, preventing the locking bar from being raised.

19. The elevating apparatus of claim 17, comprising a cushioning material coupled to the base plate.

20. The elevating apparatus of claim 17, comprising a cushioning material coupled to the platform plate.

* * * * *